(12) United States Patent
Wilson et al.

(10) Patent No.: US 11,768,589 B2
(45) Date of Patent: Sep. 26, 2023

(54) DIGITAL FLASH CARDS INCLUDING LINKS TO DIGITAL CONTENT

(71) Applicant: Barnes & Noble College Booksellers, LLC, Basking Ridge, NJ (US)

(72) Inventors: Michael Wilson, Los Angeles, CA (US); Dale J. Brewer, San Marcos, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 183 days.

(21) Appl. No.: 17/238,764

(22) Filed: Apr. 23, 2021

(65) Prior Publication Data

US 2021/0240336 A1   Aug. 5, 2021

Related U.S. Application Data

(63) Continuation of application No. 15/935,834, filed on Mar. 26, 2018, now Pat. No. 11,029,826, which is a
(Continued)

(51) Int. Cl.
*G06F 3/048* (2013.01)
*G06F 3/04842* (2022.01)
(Continued)

(52) U.S. Cl.
CPC ........ *G06F 3/04842* (2013.01); *G06F 3/0482* (2013.01); *G06F 3/0483* (2013.01);
(Continued)

(58) Field of Classification Search
CPC . G09B 19/00; G09B 5/02; G09B 7/02; G09B 5/06; G09B 7/00; G09B 7/06;
(Continued)

(56) References Cited

U.S. PATENT DOCUMENTS 5,281,146 A   1/1994  Janney
5,494,444 A   2/1996  Thayer et al.
(Continued)

OTHER PUBLICATIONS

"EPUB Canonical Fragment Identifier (epubcfi) Specification", URL: http://www.idpf.org/epub/linking/cfi/epub-cfi.html, Downloaded from the Internet on Dec. 3, 2014, 22 pages.
(Continued)

*Primary Examiner* — Steven B Theriault
(74) *Attorney, Agent, or Firm* — Finch & Maloney PLLC

(57) ABSTRACT

Techniques are disclosed for creating digital flash cards that include links to content from one or more digital content sources, referred to herein as a flash card mode. The mode allows a user to create a digital flash card by selecting a portion of a digital content source and performing a create command. The created flash card includes at least two virtual sides and a first side of the flash card identifies the location of the selected portion of digital content. The location may be identified, for example, by a canonical fragment identifier (CFI). Text can then be entered for a second side of the flash card. Flash cards can be shared with other users, and because the flash cards only identify locations of content within digital content sources, the mode is well-suited to handle sources including digital rights management (DRM) protection, for example.

20 Claims, 12 Drawing Sheets

Related U.S. Application Data continuation of application No. 14/333,931, filed on Jul. 17, 2014, now Pat. No. 9,927,963.

(51) Int. Cl.
*G06F 3/0483* (2013.01)
*G06F 3/0482* (2013.01)
*G06F 3/04883* (2022.01)
*G06Q 10/101* (2023.01)
*G06Q 30/0203* (2023.01)
*G06F 3/0488* (2022.01)
*G06F 40/169* (2020.01)

(52) U.S. Cl.
CPC ........ *G06F 3/0488* (2013.01); *G06F 3/04883* (2013.01); *G06F 40/169* (2020.01); *G06Q 10/101* (2013.01); *G06Q 30/0203* (2013.01)

(58) Field of Classification Search
CPC . G09B 5/00; G09B 7/04; G09B 19/08; G09B 19/22; G09B 11/06; G09B 17/003; G09B 17/006; G09B 19/0076; G09B 19/02; G09B 19/025; G09B 19/04; G09B 1/00; G09B 1/02; G09B 1/12; G09B 1/32; G09B 21/001; G09B 21/009; G09B 23/283; G09B 23/30; G09B 5/04; G09B 5/062; G09B 5/065; G09B 5/08; G09B 5/10; G09B 5/14; G09B 7/08; G06F 21/608; G06F 21/83; G06F 21/10; G06F 17/241; G06F 17/2735; G06F 17/30011; G06F 17/30781; G06F 17/3089; G06F 3/0483; G06F 3/04842; G06F 3/04883; G06F 13/38; G06F 13/385; G06F 13/387; G06F 13/4027; G06F 17/21; G06F 17/212; G06F 17/214; G06F 17/2229; G06F 17/27; G06F 17/277; G06F 17/2785; G06F 17/289; G06F 17/30; G06F 17/30017; G06F 17/30241; G06F 17/30477; G06F 17/30563; G06F 17/30663; G06F 17/30699; G06F 19/322; G06F 19/328; G06F 19/363; G06F 21/30; G06F 21/44; G06F 21/606; G06F 21/6218; G06F 21/73; G06F 3/011; G06F 3/013; G06F 3/0481; G06F 3/04815; G06F 3/0482; G06F 3/0488; G06F 3/0646

See application file for complete search history.

(56) References Cited

U.S. PATENT DOCUMENTS

| | | | |
|---|---|---|---|
| 5,632,624 A | 5/1997 | Cameron et al. | |
| 6,486,895 B1* | 11/2002 | Robertson | G06F 3/0483 715/776 |
| 6,539,406 B1* | 3/2003 | Ibarra | G06F 40/166 715/205 |
| 7,424,669 B2 | 9/2008 | Bhogal et al. | |
| 8,082,505 B2 | 12/2011 | Meimer et al. | |
| 8,255,495 B1* | 8/2012 | Lee | H04L 67/02 709/219 |
| 8,332,747 B2 | 12/2012 | Carro et al. | |
| 8,442,844 B1* | 5/2013 | Trandal | G06Q 30/012 705/35 |
| 8,447,697 B2 | 5/2013 | Wang et al. | |
| 8,761,660 B2 | 6/2014 | Libin | |
| 9,256,588 B1 | 2/2016 | Moscovich et al. | |
| 9,275,028 B2 | 3/2016 | Migos et al. | |
| 9,317,669 B1 | 4/2016 | Gray | |
| 9,575,615 B1* | 2/2017 | Nicholls | G06F 3/048 |
| 9,927,963 B2 | 3/2018 | Wilson et al. | |
| 2003/0002086 A1 | 1/2003 | Thomason | |
| 2003/0060284 A1 | 3/2003 | Hamalainen et al. | |
| 2003/0076352 A1 | 4/2003 | Uhlig et al. | |
| 2003/0117425 A1* | 6/2003 | O'Leary | G06F 3/0483 715/700 |
| 2003/0229858 A1 | 12/2003 | Keohane et al. | |
| 2004/0148503 A1 | 7/2004 | Sidman | |
| 2004/0219494 A1 | 11/2004 | Boon | |
| 2005/0003331 A1 | 1/2005 | Menzies | |
| 2005/0055306 A1* | 3/2005 | Miller | G06Q 40/04 705/37 |
| 2005/0273378 A1 | 12/2005 | MacDonald-Korth et al. | |
| 2006/0040242 A1 | 2/2006 | Mejia | |
| 2006/0154225 A1 | 7/2006 | Kim | |
| 2006/0173919 A1 | 8/2006 | Owen Rees et al. | |
| 2006/0183099 A1 | 8/2006 | Feely et al. | |
| 2006/0184866 A1 | 8/2006 | Rees | |
| 2007/0097802 A1* | 5/2007 | Polson | G11B 7/00736 369/30.07 |
| 2007/0150457 A1 | 6/2007 | Goldman et al. | |
| 2007/0190512 A1* | 8/2007 | Meimer | G09B 5/00 715/730 |
| 2007/0226260 A1 | 9/2007 | Williams et al. | |
| 2007/0269044 A1 | 11/2007 | Bruestle | |
| 2007/0269788 A1 | 11/2007 | Flowers et al. | |
| 2008/0162275 A1 | 7/2008 | Logan et al. | |
| 2009/0019078 A1 | 1/2009 | Chisholm et al. | |
| 2009/0063431 A1* | 3/2009 | Erol | G06V 30/414 |
| 2009/0064028 A1 | 3/2009 | Garvey et al. | |
| 2009/0075247 A1 | 3/2009 | Tucci | |
| 2009/0077479 A1 | 3/2009 | Tucci | |
| 2009/0083637 A1 | 3/2009 | Skakkebaek et al. | |
| 2009/0091087 A1 | 4/2009 | Wasmund | |
| 2009/0111084 A1 | 4/2009 | Mccarty | |
| 2009/0248960 A1* | 10/2009 | Sunderland | G06F 16/00 711/E12.008 |
| 2009/0253113 A1 | 10/2009 | Tuve | |
| 2009/0295088 A1 | 12/2009 | Chan | |
| 2010/0023878 A1 | 1/2010 | Douris et al. | |
| 2010/0156913 A1 | 6/2010 | Ortega et al. | |
| 2010/0262659 A1 | 10/2010 | Christiansen et al. | |
| 2010/0313137 A1 | 12/2010 | Fein et al. | |
| 2011/0097698 A1 | 4/2011 | Henderson | |
| 2011/0123974 A1* | 5/2011 | Steinglass | H02H 7/1206 434/362 |
| 2011/0125867 A1* | 5/2011 | Denk, Jr. | G06Q 90/00 709/217 |
| 2011/0195391 A1 | 8/2011 | Stone | |
| 2011/0251837 A1 | 10/2011 | Conboy et al. | |
| 2011/0318723 A1 | 12/2011 | Jeong | |
| 2012/0011428 A1 | 1/2012 | Chisholm | |
| 2012/0052478 A1 | 3/2012 | Reid | |
| 2012/0084373 A1 | 4/2012 | Chen et al. | |
| 2012/0173578 A1 | 7/2012 | Cheong | |
| 2012/0197688 A1 | 8/2012 | Townshend et al. | |
| 2012/0221938 A1 | 8/2012 | Patterson et al. | |
| 2012/0240025 A1 | 9/2012 | Migos et al. | |
| 2012/0251994 A1 | 10/2012 | Gray | |
| 2012/0288846 A1 | 11/2012 | Hull | |
| 2013/0024223 A1 | 1/2013 | Thomas | |
| 2013/0047115 A1* | 2/2013 | Migos | G06F 3/0484 715/776 |
| 2013/0054636 A1 | 2/2013 | Tang | |
| 2013/0095464 A1 | 4/2013 | Ediger et al. | |
| 2013/0104028 A1 | 4/2013 | Murray et al. | |
| 2013/0194308 A1* | 8/2013 | Privault | G06T 11/60 345/650 |
| 2013/0227271 A1 | 8/2013 | Pampagnin | |
| 2013/0275891 A1 | 10/2013 | Holiday | |
| 2013/0277915 A1* | 10/2013 | Garrett | A63F 3/0402 273/293 |
| 2013/0290106 A1 | 10/2013 | Bradley et al. | |
| 2013/0311870 A1 | 11/2013 | Worsley et al. | |
| 2013/0332805 A1* | 12/2013 | Brassell | G06F 40/134 715/201 |
| 2013/0342470 A1 | 12/2013 | Acar | |
| 2014/0025519 A1 | 1/2014 | Thomas | |

(56) References Cited

U.S. PATENT DOCUMENTS

| | | |
|---|---|---|
| 2014/0040472 A1 | 2/2014 | Philippe |
| 2014/0052562 A1 | 2/2014 | Oliveira et al. |
| 2014/0089775 A1 | 3/2014 | Worsley et al. |
| 2014/0162243 A1 | 6/2014 | Lamkin |
| 2014/0164352 A1 | 6/2014 | Denninghoff |
| 2014/0195337 A1* | 7/2014 | Taylor ................ G06Q 30/0277 705/14.71 |
| 2014/0281931 A1 | 9/2014 | Masood et al. |
| 2015/0074397 A1 | 3/2015 | Dube et al. |
| 2015/0106760 A1 | 4/2015 | Axelsson et al. |
| 2015/0169704 A1* | 6/2015 | Stekkelpak ........... G06F 16/951 715/765 |
| 2015/0170115 A1 | 6/2015 | Lacek |
| 2015/0179082 A1 | 6/2015 | Byron |
| 2015/0186346 A1 | 7/2015 | Havilio |
| 2015/0228197 A1 | 8/2015 | McKinney et al. |
| 2015/0264020 A1 | 9/2015 | Ackerly et al. |
| 2015/0304387 A1 | 10/2015 | Landau |
| 2016/0018968 A1 | 1/2016 | Wilson et al. |
| 2016/0188558 A1 | 6/2016 | Shikawa et al. |
| 2018/0210631 A1 | 7/2018 | Wilson et al. |
| 2019/0121518 A1 | 4/2019 | Anima et al. |

OTHER PUBLICATIONS

"Flashcard", Wikipedia, the free encyclopedia, URL: http://en.wikipedia.org/wiki/Flashcard, Downloaded from the Internet on Dec. 3, 2014, 4 pages.

"List of Flashcard Software", Wikipedia, the free encyclopedia, URL: http://en.wikipedia.org/wiki/List_of_flashcard_software, Downloaded from the Internet Dec. 31, 2014, 2 pages.

* cited by examiner

DIGITAL FLASH CARDS INCLUDING LINKS TO DIGITAL CONTENT

RELATED APPLICATIONS

This application is a continuation of U.S. patent application Ser. No. 15/935,834, filed Mar. 26, 2018, which is a continuation of U.S. patent application Ser. No. 14/333,931, filed Jul. 17, 2014, now U.S. Pat. No. 9,927,963, the disclosures of which are incorporated by reference herein in their entirety.

FIELD OF THE DISCLOSURE

This disclosure relates to electronic computing devices, and more particularly, to creating and interacting with digital flash cards including links to the location of digital content.

BACKGROUND

Electronic computing devices such as tablets, eReaders, mobile phones, smart phones, personal digital assistants (PDAs), and other such devices are commonly used for displaying digital content. The content may be, for example, an eBook, a web page, an online article or blog, images, a movie or video, a map, just to name a few types. Such devices may also be useful for displaying a user interface that allows a user to interact with one or more applications running on the device. The applications may allow a user to read or browse through digital content, such as electronic books (eBooks), magazines, catalogs, or comics, for example. The computing devices may also include a touch-sensitive surface/interface for receiving user input such as a touch screen or a track pad (e.g., in combination with a non-touch-sensitive display). The user may interact with such touch-sensitive electronic computing devices using fingers and/or a stylus, for example.

DETAILED DESCRIPTION

Figure 1A:
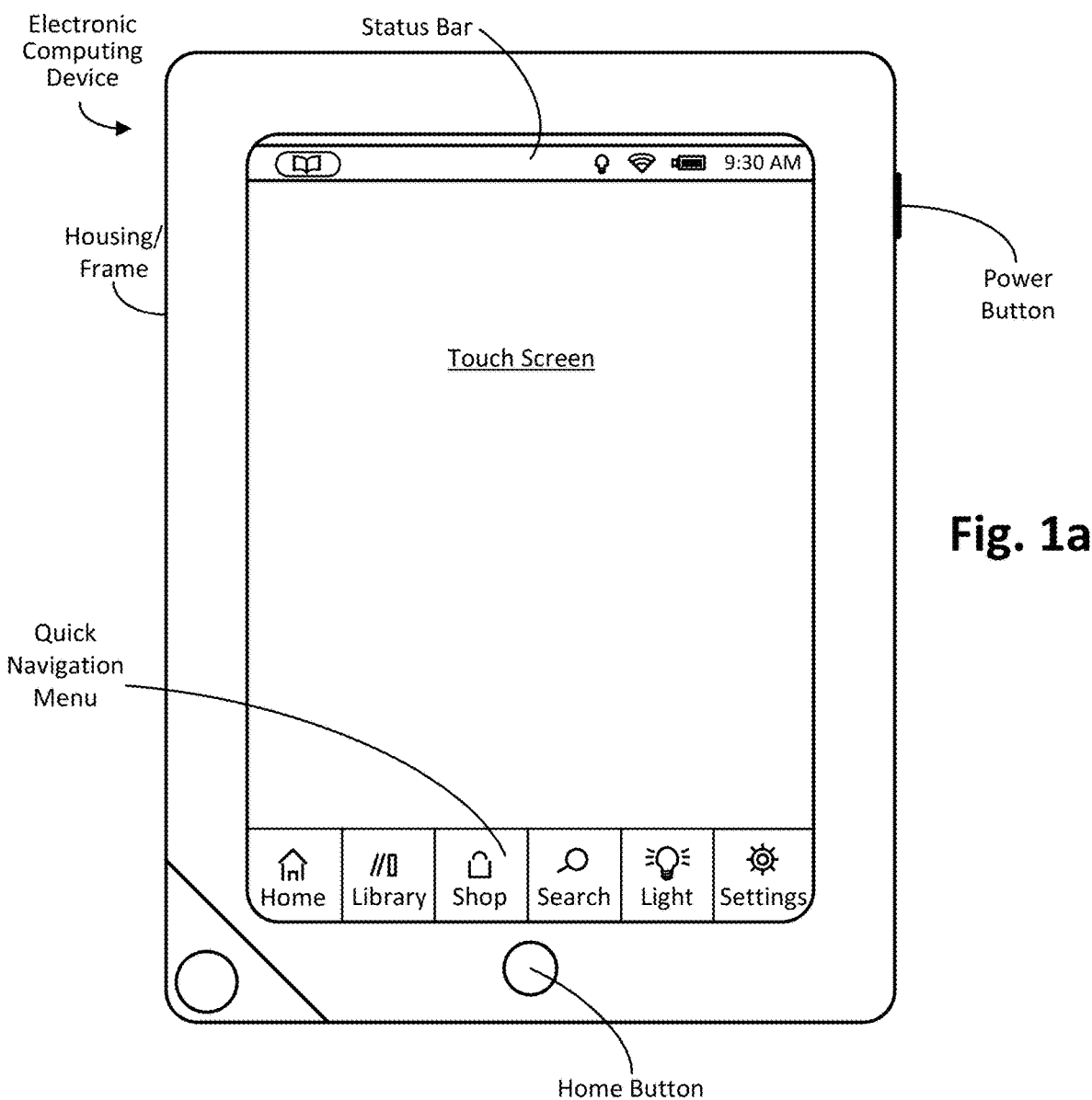
FIG. 1a illustrates an example electronic computing device, configured in accordance with one or more embodiments of the present invention.

Techniques are disclosed for creating (and interacting with) digital flash cards that include links to content from one or more digital content sources, referred to herein as a flash card mode. The mode allows a user to create a digital flash card by selecting a portion of a digital content source and performing a create command. The selected digital content can effectively be treated as the answer portion of the flash card question-answer construct, in accordance with an embodiment. Once a flash card is created in response to selecting a portion of digital content and performing the create command, the user is prompted to type or otherwise enter the question portion of that construct, in accordance with such an embodiment. The created flash card can be saved for later reference, and includes at least two virtual sides. For example, one side may include the user-generated (or otherwise provided) question and the other side may identify the location of the selected portion of content representing the answer to that question. The location of the selected portion of content may be identified using a canonical fragment identifier (CFI), although other suitable content location identifiers can be used, as will be appreciated in light of this disclosure. The cards can also be shared with other users (such as classmates or other students taking the same course), and because the flash cards only include the location of content, the mode is well-suited to handle content including digital rights management (DRM) protection, in accordance with an embodiment. In one such example case, a subsequent user that opens a shared flash card is prompted to buy/rent the protected content source(s) only if that user does not already own (or otherwise have rights to use) that content source(s). In another such example case, the subsequent user may be allowed to buy/rent a subset of the protected content, such as only the content specifically used on the flash card or the block of content from which the selected content was taken (e.g., only a section, chapter, etc.). In still other scenarios, if the subsequent user already has existing rights to access the protected content (e.g., because the subsequent user also owns a copy of the protected content), then no prompting to buy/rent is needed. In any such cases, once it is established that the subsequent user is allowed access to the protected content, the flash card will virtually show that content, in accordance with an embodiment. However, in some such cases, if the subsequent user has no right to access the protected content and does not wish to buy/rent that content, then the flash card will virtually show only the location of that content (and/or an error message, for example), plus the user-generated question. Numerous other configurations and variations will be apparent in light of this disclosure. For instance, the user-generated content may also be treated as protected content that is required to be purchased, if so desired.

General Overview

Flash cards are a way of presenting information and are widely used to aid memorization and learning. A single flash card typically has two sides, each side including information, and multiple flash cards can be organized into a set. Techniques for creating and interacting with digital flash cards exist to simulate the creation of and interaction with non-digital flash cards. However, such conventional techniques do not include the ability to intuitively create flash cards using content from one or more already existing digital content sources, such as electronic books (eBooks) or other electronic documents. Further, such conventional techniques do not have solutions for addressing digital rights management (DRM) and copyright issues that may affect the ability to use content from those digital content sources.

Thus, and in accordance with one or more embodiments of the present invention, techniques are disclosed for creating (and interacting with) digital flash cards that include links to the location of portions of digital content from one or more digital content sources, referred to collectively herein as a flash card mode. In an example embodiment, a digital flash card can be created by selecting a portion of an eBook and performing a create command (e.g., selecting a create button, selecting a create context menu option, performing a create gesture, etc.). The created digital flash card includes at least two virtual sides, where a first side of the flash card includes a link to the location of the selected portion of digital content (or otherwise identifies the location of the selected portion). For example, in the case of an EPUB format eBook, the location of the selected portion may be identified by a canonical fragment identifier (CFI). Further, the location of the selected portion of digital content may be identified by a single CFI including the range of the selected portion or by a beginning and ending CFI. Note that the CFI may identify the eBook source (e.g., using an international standard book number (ISBN) identifier or other suitable identifier). In such an example embodiment, the link to the location of the selected portion may be created on (or otherwise included with) a first side of the flash card. Then, the user may be prompted to type (or otherwise enter) information on a second side of the flash card. For example, in some embodiments, the created flash card may follow a question-answer construct, where the linked-to content on the first side of the flash card represents an answer and the user-generated content on the second side of the flash card represents a question. In some instances, the user may be able to include additional links to content on a desired side of the created flash card, as will be apparent in light of this disclosure.

In some embodiments, one or more flash cards can be created using the flash card mode to form a flash card set. Organizing flash cards into a flash card set may facilitate interacting with the group of flash cards. For example, the flash card mode may be configured to provision a flash card panel accessible from an application (such as an eBook reader application) that allows a user to interact with created flash cards, as will be apparent in light of this disclosure. In some embodiments, flash cards or flash card sets can be shared with or sold to others, or interacted with in other ways (e.g., edited, moved, organized, etc.). Note that a single flash card or a single flash card set may include links to content in multiple digital content sources, such as to multiple eBooks, for example.

As will be apparent in light of this disclosure, the flash card mode as variously described herein is particularly well-suited for use with digital content sources including digital rights management (DRM) technology, copyright protection, or other restrictions on use of content from the digital content sources, because flash cards created using the flash card mode do not include the actual content from those digital content sources. Instead, flash cards created using the flash card mode include links to the location of content from those sources, and therefore, do not include content having DRM or copyright restrictions, or any other restrictions on the use, sharing, selling, etc. of such content. For example, if a user desires to buy a flash card set, the flash card mode may be configured, in some embodiments, to verify whether the user has free access to all of the sources linked-to by the flash card set. Having free access to a digital content source may include owning the source or owning a license to the source, having limited time/scope accessibility to the source (e.g., renting or loaning the source through a virtual library, only having access to the book for one school semester, etc.), or the source being DRM-free, just to name a few examples. If the user has free access to all of the sources, then the user may be able to access the flash card set content for free or for only the price of the flash card set itself (e.g., in cases where the flash card set is sold). However, in cases where the user does not have free access to one or more of the sources linked-to by the flash card set, the flash card mode may be configured, in some embodiments, to require the user to purchase/rent those sources or to just purchase/rent the linked-to content in the flash card set.

In some embodiments, the flash card mode may be configured at a global level (e.g., based on the UI settings of the device) and/or at an application level (e.g., based on the specific application being used to interact with the digital content). For example, the mode may be configured to be enabled for some applications and disabled for others. To this end, one or more of the mode features may be user-configurable, hard-coded, or some combination thereof (e.g., where some aspects are user-configurable and others are hard-coded), as will be apparent in light of this disclosure. Further, the flash card mode may be included initially with the UI (or operating system) of an electronic computing device or be included in a separate program/service/application configured to interface with the UI of such a device to incorporate the functionality of the mode as variously described herein. In some embodiments, the mode may come in the form of a computer program product (one or more non-transient computer readable mediums) that includes a plurality of instructions non-transiently encoded thereon, that, when executed by one or more processors, cause a process to be carried out that includes the functionality of the flash card mode as variously described herein.

As will be apparent in light of this disclosure, the flash card mode may be used on any suitable electronic computing device, such as various smartphones, tablets, and eReaders. In such devices including a touch-sensitive UI, user input may be referred to as contact or user contact for ease of reference. However, direct and/or proximate contact (e.g., hovering within a few centimeters of the touch-sensitive surface) may be used to provide user input to the device, depending on the specific touch-sensitive surface/interface being used. In other words, in some embodiments, a user need not even physically touch the device or its touch-sensitive surface/interface to provide input. Also note that the user contact (whether direct or proximate) may be provided by the user's hand (or another suitable body part) or a stylus (or some other suitable implement), for example. In some embodiments, user input may be provided in various other ways, such as through voice commands or sounds, or through any other suitable method. Numerous variations and configurations will be apparent in light of this disclosure.

Computing Device and Configuration Examples

FIG. 1a illustrates an example electronic computing device, configured in accordance with one or more embodiments of the present invention. The device could be, for example, a tablet such as the NOOK® tablet by BARNES & NOBLE®. In a more general sense, the device may be any computing device capable of displaying digital content, such as a smart phone, eReader, tablet computer, laptop, or desktop computer, for example. In some instances, the computing device may be touch-sensitive and include a touch screen display or a non-touch-sensitive display screen that can be used in conjunction with a touch-sensitive surface/interface, such as a track pad. As will be appreciated in light of this disclosure, the present disclosure is not intended to be limited to any particular kind or type of computing device. For ease of description, an example computing device is provided herein with touch screen technology.

As can be seen with the example embodiment shown in FIG. 1a, the device comprises a housing/frame that includes a number of hardware features such as a power button and a press-button (sometimes called a home button herein). A touch screen based user interface (UI) is also provided (although a computing device running the flash card mode as variously described herein need not be touch-sensitive), which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI touch or non-touch controls and features can be implemented using any suitable conventional or custom technology, as will be appreciated.

Although the computing device shown in FIG. 1a uses a touch screen display, other touch-sensitive embodiments may include a non-touch screen and a touch-sensitive surface such as a track pad, or a touch-sensitive housing configured with one or more acoustic sensors, etc. As previously described, the computing device need not be touch-sensitive and may receive input from physical buttons, directional pads, joysticks, mouse pointing devices, and physical keyboards, just to name a few other input device examples. Continuing with the example computing device shown in FIG. 1a, the power button can be used to turn the device on and off, and may be used in conjunction with a touch-based UI control feature that allows the user to confirm a given power transition action request (e.g., such as a slide bar or tap point graphic to turn power off). In this example device, the home button is a physical press-button that can be used to display the device's home screen when the device is awake and in use. Note that the buttons as variously described herein may be physical, virtual, or some combination thereof, depending upon the embodiment. The home button (or other buttons) may also be used in conjunction with the flash card mode as disclosed herein to, for example, exit the flash card mode or cancel a flash card mode action. Numerous other configurations and variations will be apparent in light of this disclosure, and the present disclosure is not intended to be limited to any particular set of control features or device form factor.

Figure 1B:
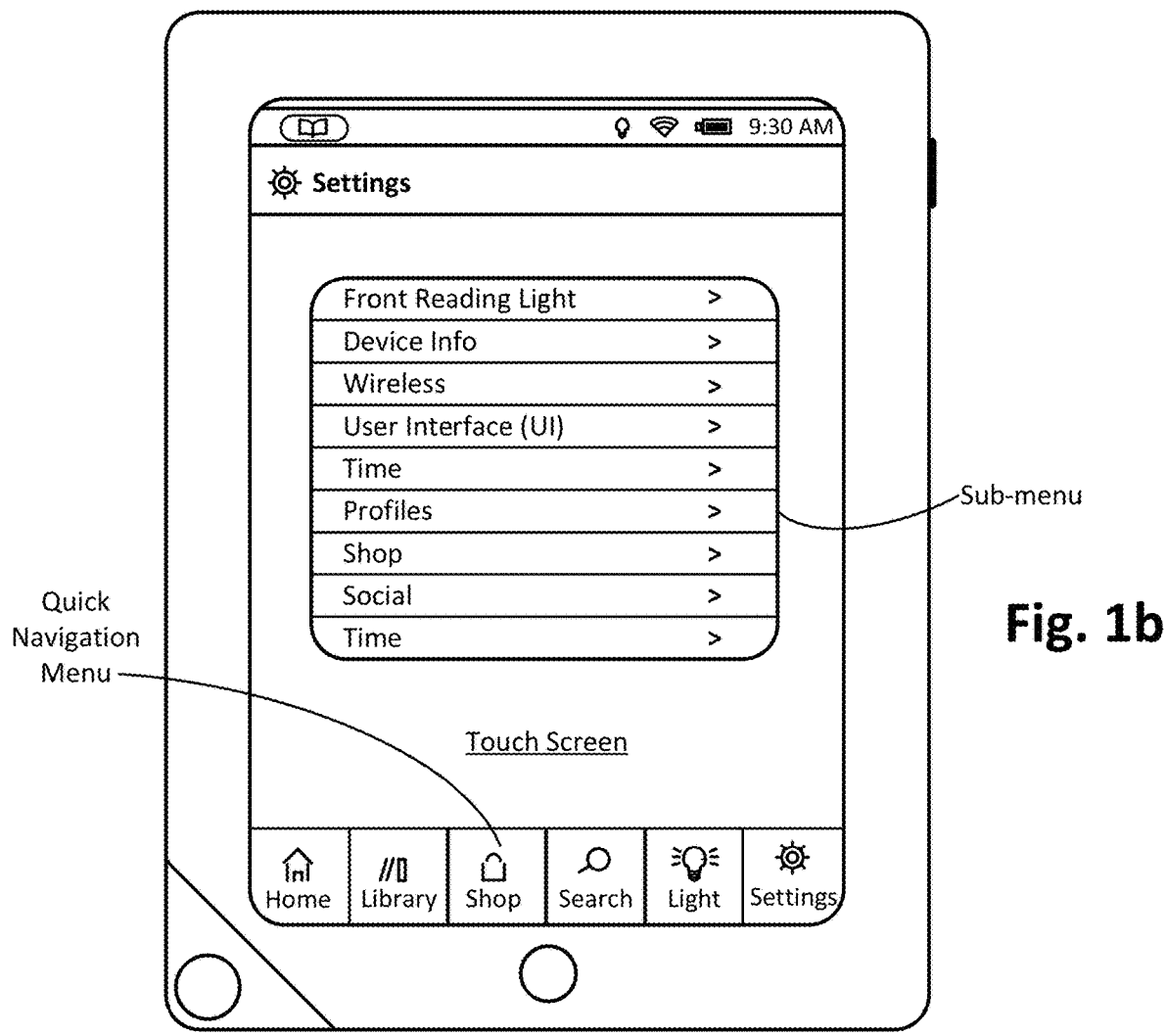
FIGS. 1b-c illustrate example configuration screen shots of the user interface of the computing device shown in FIG. 1a, in accordance with an embodiment of the present invention.
Figure 1C:
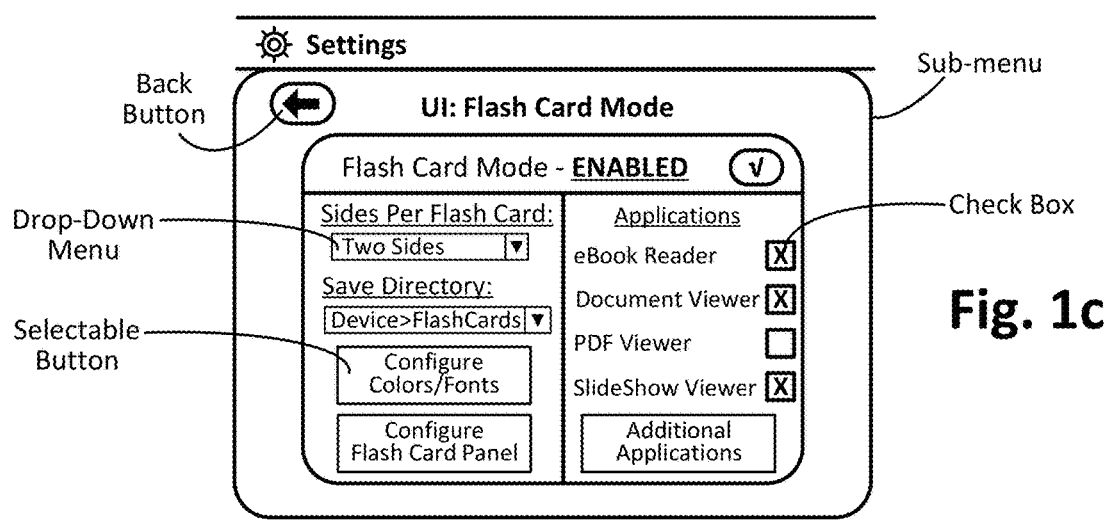

Continuing from FIG. 1a, the user can access a configuration sub-menu, such as the Flash Card Mode configuration sub-menu shown in FIG. 1c, by tapping or otherwise selecting the Settings option in the quick navigation menu, which causes the device in this embodiment to display the general sub-menu shown in FIG. 1b. From this general sub-menu the user can select any one of a number of options, including one designated User Interface (UI) in this specific example case. Selecting this sub-menu item (with, for example, an appropriately placed screen tap) may cause the configuration sub-menu of FIG. 1c to be displayed, in accordance with an embodiment. In other example embodiments, selecting the User Interface (UI) option may present the user with a number of additional sub-options, one of which may include an eReader option, which may then be selected by the user so as to cause the configuration sub-menu of FIG. 1c to be displayed. Any number of such menu schemes and nested hierarchies can be used, as will be appreciated in light of this disclosure. In other embodiments, the flash card mode as described herein may be hard-coded such that no configuration is needed or otherwise permitted. The degree of hard-coding versus user-configurability can vary from one embodiment to the next, and the present disclosure is not intended to be limited to any particular configuration scheme of any kind, as will be apparent in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates one or more touches (whether direct or proximate and whether made by a user's hand, a stylus, or some other suitable implement) in a particular location(s) into an electrical signal, which is then received and processed by the underlying operating system (OS), system software, and circuitry (processor, etc.) of the computing device. In some instances, note that the user need not actually physically touch the touch-sensitive surface/interface to provide user input (e.g., when the touch-sensitive surface/interface recognizes hovering input). In embodiments where the computing device is not-touch-sensitive, input may be provided using a mouse, joystick, or directional pad, and one or more buttons, for example, to provide input similar to touching a touch screen. In some embodiments, the UI may allow other user interactions, such as voice-commands. Additional example details of the underlying OS and circuitry in accordance with some embodiments will be discussed in turn with reference to FIG. 2a. As previously explained, in some cases, the flash card mode as described herein may be automatically configured by the specific UI or application being used. In these instances, the mode need not be user-configurable (e.g., if the mode is hard-coded or are otherwise automatically configured).

Continuing with FIG. 1b, once the Settings sub-menu is displayed, the user can then select the User Interface (UI) option. In response to such a selection, the Flash Card Mode configuration sub-menu shown in FIG. 1c can be provided to the user. In this example case, the configuration sub-menu includes a UI check box that when checked or otherwise selected by the user, effectively enables the mode (shown in the Enabled state); unchecking the box disables the mode. Other embodiments may have the flash card mode always enabled, while in other embodiments the mode may be enabled or disengaged by a physical switch or button, or by a uniquely identifiable gesture or screen contact, for example.

As can be seen in the example shown in FIG. 1c, the sub-menu includes a left section that allows a user to configure a number of options for the flash card mode and a right section that allows a user to enable/disable the flash card mode for various applications. The left section in this example of the sub-menu includes a configuration option that allows a user to select the Sides Per Flash Card using the corresponding drop-down menu. As shown, the number of virtual sides per flash card is set as Two Sides; however, the flash card mode may be configured to allow digital flash cards having three or more virtual sides, as will be apparent in light of this disclosure. The next configuration option allows the user to select the Save Directory where generated digital flash cards are saved/stored. In this example embodiment, the save directory may be set to a default location and then user may be able to set it to a different location, if desired. In other embodiments, the save directory may be non-configurable or hard-coded. Additional selectable buttons are shown that allow the user to Configure Colors/Fonts related to generated digital flash cards and to Configure Flash Card Panel options, in this example embodiment. The configuration options presented in this example embodiment are shown for illustrative purposes (e.g., to illustrate that one or more aspects of the flash card mode may be user-configurable) and the flash card mode may include additional and/or other customizable features or aspects, as will be apparent in light of this disclosure.

The right side of the settings sub-menu screen shot shown in FIG. 1c includes an Applications section that allows a user to individually enable the flash card mode for specific applications, in this example embodiment. Such a configuration feature may be helpful, for instance, in a tablet or laptop or other multifunction computing device that can execute different applications (as opposed to a computing device that is more or less dedicated to a particular application). As previously explained, in some embodiments, the flash card mode may be application specific or configured at an application level. As can be seen in the example screen shot shown in FIG. 1c, the mode is enabled for the eBook Reader, Document Viewer, and SlideShow Viewer applications. For completeness of description, the mode is disabled for the PDF Viewer application, in this example case. The settings screen also includes an Additional Applications button that can be selected, in this example embodiment, to allow a user to enable/disable the flash card mode for other applications. In some embodiments, the flash card mode may be later enabled for a particular application from this settings screen or enabled from within a specific application.

In some embodiments, the flash card may be related or tied to one or more specific applications of the device's UI (or operating system), such that the mode is only available, active, or running when such an application is available, active, or running. For example, the mode may only be available, active, or running when an eBook reader application is active and/or displayed, which may save a computing device's memory and/or power consumption. Any number of applications or device functions may benefit from the flash card mode as variously provided herein, whether user-configurable or not, and the present disclosure is not intended to be limited to any particular application or set of applications.

As can be further seen, a back button UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1b and 1c show user configurability, other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind.

Architecture

Figure 2A:
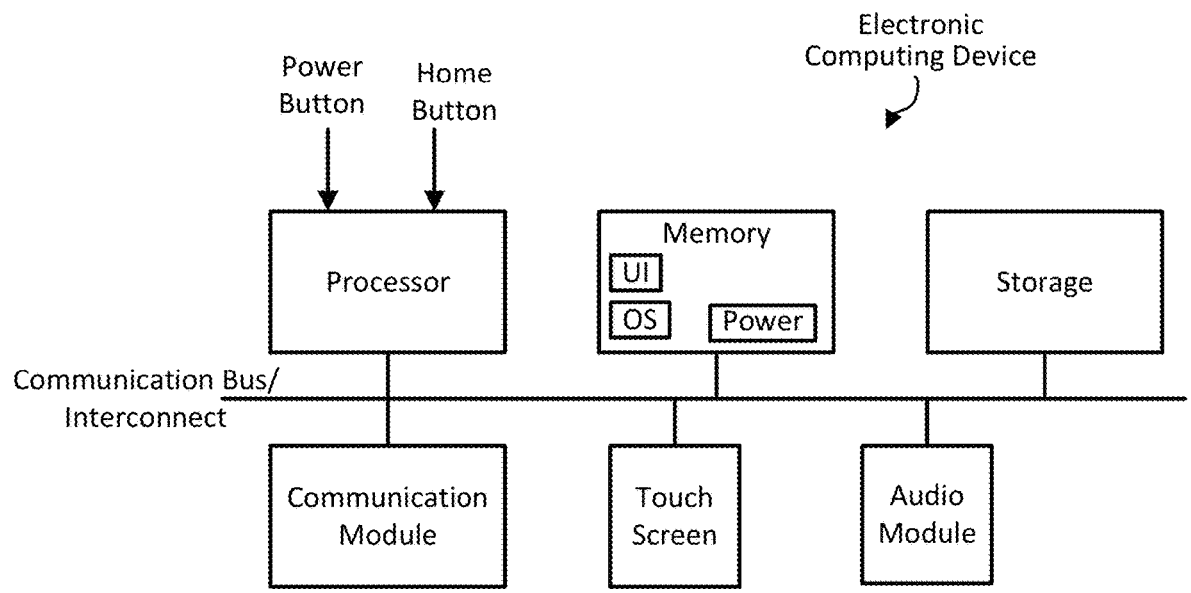
FIG. 2a illustrates a block diagram of an electronic computing device, configured in accordance with an embodiment of the present invention.

FIG. 2a illustrates a block diagram of a computing device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc.). Further note that although a touch screen display is provided, other touch-sensitive embodiments may include a non-touch screen and a touch-sensitive surface such as a track pad, or a touch-sensitive housing configured with one or more acoustic sensors, etc. In this manner, a non-touch-sensitive computing device can become a touch-sensitive computing device by adding an interfacing touch-sensitive component. However, as previously explained, some embodiments may be non-touch-sensitive. The principles provided herein equally apply to any such computing device. For ease of description, examples are provided with touch screen technology.

The touch-sensitive surface (touch-sensitive display or touch screen, in this example) can be any device that is configured with user input detecting technologies, whether capacitive, resistive, acoustic, active or passive stylus, and/or other input detecting technology. The screen display can be layered above input sensors, such as a capacitive sensor grid for passive touch-based input (e.g., with a finger or passive stylus in the case of a so-called in-plane switching (IPS) panel), or an electro-magnetic resonance (EMR) sensor grid (e.g., for sensing a resonant circuit of the stylus). In some embodiments, the touch screen display can be configured with a purely capacitive sensor, while in other embodiments the touch screen display may be configured to provide a hybrid mode that allows for both capacitive input and active stylus input. In any such embodiments, a touch screen controller may be configured to selectively scan the touch screen display and/or selectively report contacts detected directly on or otherwise sufficiently proximate to (e.g., within a few centimeters) the touch screen display. The proximate contact may include, for example, hovering input used to cause location specific input as though direct contact were being provided on a touch-sensitive surface (such as a touch screen). Numerous touch screen display configurations can be implemented using any number of known or proprietary screen based input detecting technology.

Continuing with the example embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device, including the flash card mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button, home button, and touch-sensitive surface. In other embodiments, the processor may be configured to receive input from other input devices, such as from a mouse or keyboard, for example, to determine if such devices are being used to provide input. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The display can be implemented, for example, with a 7 to 9 inch 1920×1280 IPS LCD touchscreen touch screen, or any other suitable display and touch-sensitive interface technology. The communications module can be, for instance, any suitable 802.11 b/g/n WLAN chip or chip set, which allows for connection to a local network so that content can be downloaded to the device from a remote location (e.g., content provider, etc., depending on the application of the display device). In some specific example embodiments, the device housing or frame that contains all the various componentry measures about 7" to 9" high by about 5" to 6" wide by about 0.5" thick, and weighs about 7 to 8 ounces. Any number of suitable form factors can be used, depending on the target application (e.g., laptop, smart phone, etc.). The device may, for example, smaller for smart phone and eReader applications and larger for tablet computer applications.

The operating system (OS) module can be implemented with any suitable OS, but in some example embodiments is implemented with GOOGLE ANDROID OS or LINUX OS or MICROSOFT OS or APPLE OS. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The audio module can be configured, for example, to speak or otherwise aurally present a selected eBook or other textual content. In some example cases, if additional space is desired, for example, to store digital books or other content and media, storage can be expanded via a microSD card or other suitable memory expansion technology (e.g., 32 GBytes, or higher). The UI module can be, for example, based on touch screen technology, and the various example screen shots and example use-cases shown in FIGS. 1*a-c*, 3*a-j*, 4*a-c*, and 5*a-d*, in conjunction with the methodology demonstrated in FIG. 6, which will be discussed in turn.

Client-Server System

Figure 2B:
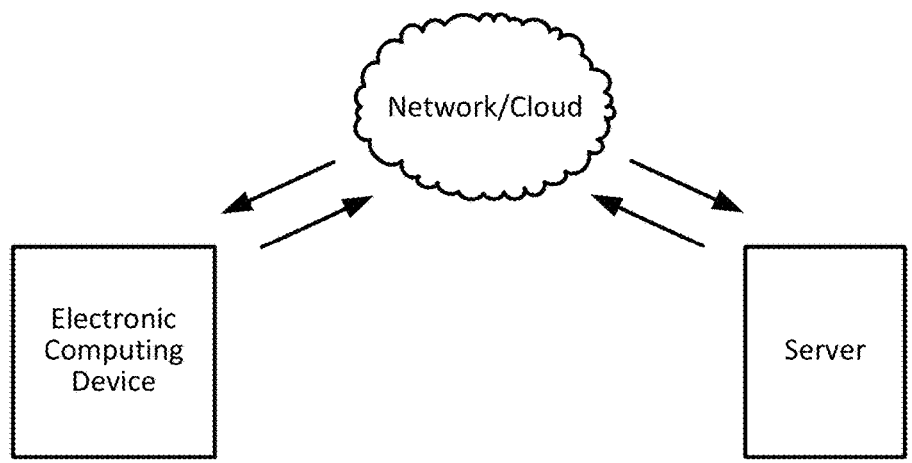
FIG. 2b illustrates a block diagram of a communication system including the electronic computing device of FIG. 2a, configured in accordance with an embodiment of the present invention.

FIG. 2*b* illustrates a block diagram of a communication system including the electronic computing device of FIG. 2*a* configured in accordance with an embodiment of the present invention. As can be seen, the system generally includes an electronic computing device that is capable of communicating with a server via a network/cloud. In this example embodiment, the computing device may be, for example, an eReader, a smart phone, a laptop, a tablet computer, a desktop computer, or any other suitable computing device. The network/cloud may be a public and/or private network, such as a private local area network operatively coupled to a wide area network such as the Internet. In this example embodiment, the server may be programmed or otherwise configured to receive content requests from a user via the computing device and to respond to those requests by providing the user with requested or otherwise recommended content. In some such embodiments, the server may be configured to remotely provision the flash card mode as variously provided herein to the computing device (e.g., via JavaScript or other browser based technology). In other embodiments, portions of the methodology may be executed on the server and other portions of the methodology may be executed on the device. Numerous server-side/client-side execution schemes can be implemented to facilitate the flash card mode as disclosed herein in accordance with one or more embodiments, as will be apparent in light of this disclosure.

Flash Card Mode Examples

Figure 3A:
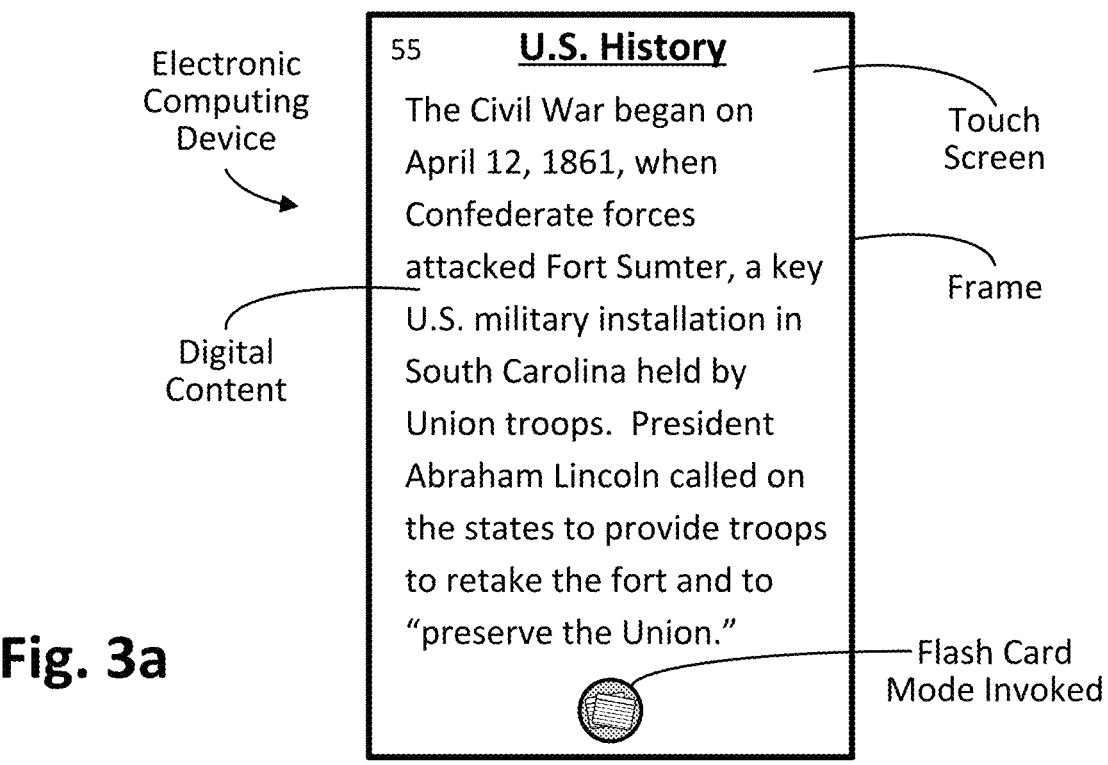
FIGS. 3a-j collectively illustrate an example flash card mode for an electronic computing device, in accordance with one or more embodiments of the present invention.

FIGS. 3*a-j* collectively illustrate an example flash card mode for an electronic computing device, in accordance with one or more embodiments of the present invention. As can be seen in FIG. 3*a*, the electronic computing device is shown having a housing/frame that includes a touch screen for displaying content and allowing user input (whether direct or proximate). The digital content that the touch screen in FIG. 3*a* is displaying is a page of an eBook, and more specifically, page 55 of the eBook "U.S. History." The eBook may be displayed or otherwise presented using an eReader application, or some other suitable application or program. The flash card mode will be primarily discussed herein with reference to creating flash cards from one or more eBooks for ease of description; however, the flash card mode is not intended to be so limited. For example, the flash card mode may be used with other electronic documents, electronic presentations, websites, or any other suitable digital content sources. Although the flash card mode is being illustrated in FIGS. 3*a-j* on a touch-sensitive device having a touch screen, other touch-sensitive devices may include a non-touch display screen that can be used in conjunction with a touch-sensitive surface/interface, such as a track pad, as previously described. As was also previously described, the flash card mode may be used on a non-touch-sensitive computing device; however, a touch-sensitive computing device is used herein for ease of description.

Figure 3B:
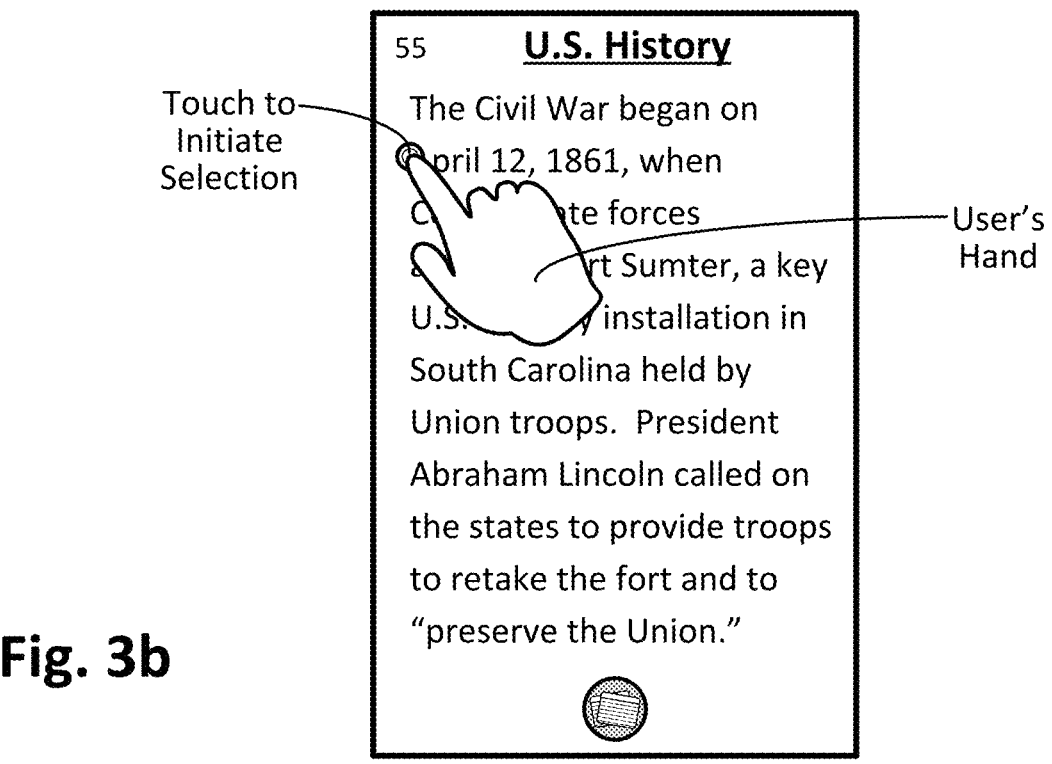
Figure 3C:
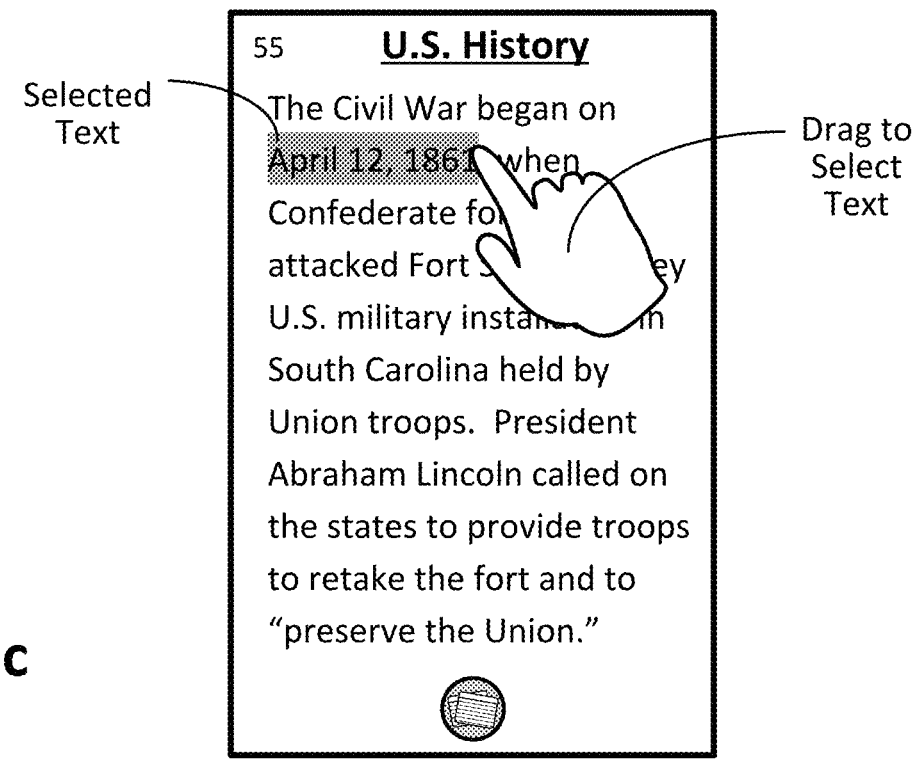

Continuing with the screen shot shown in FIG. 3*a*, a graphic is displayed at the bottom of the screen to indicate that the flash card mode has been invoked. The flash card mode may be invoked using the graphic shown (e.g., by tapping the gesture and selecting to invoke the flash card mode, swiping the gesture in a particular manner, etc.) or in another suitable manner (e.g., through a list of menu options, through use of a specific gesture, through selection of a particular button or button sequence, etc.). In some embodiments, the flash card mode may have to be enabled prior to invoking the mode (e.g., as was discussed with reference to FIG. 1*c*). FIG. 3*b* shows a user making contact (using a finger on a hand of the user) or touching the touch screen to initiate a selection of a portion of the displayed eBook page. FIG. 3*c* shows the user dragging the contact made in FIG. 3*b* to select text. The selected text, in this example embodiment, is highlighted to indicate the portion that has been selected to the user; however, the selection may be indicated in any other suitable manner (e.g., underlining or italicizing the selected text, making the selected text bold, etc.). Although the flash card mode is being illustrated through the selection of text, the mode need not be so limited. For example, the mode may allow a user to also (or alternatively) select images, videos, audio files, or any other suitable portion of already created digital content.

Figure 3D:
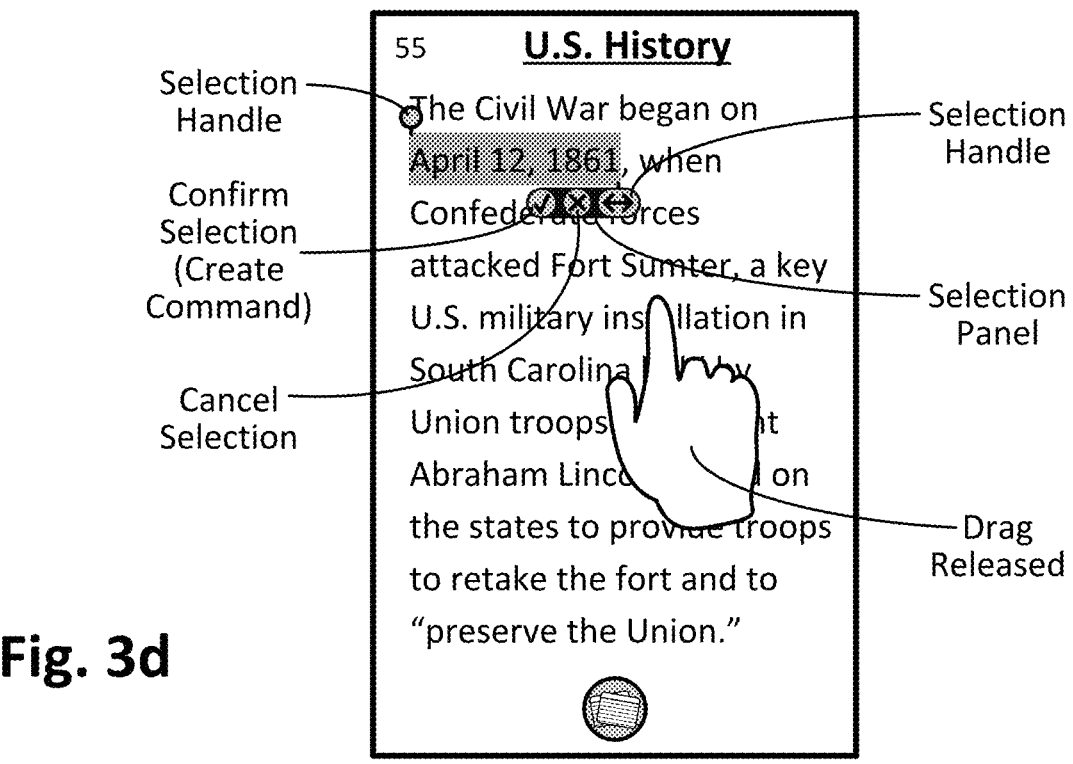

FIG. 3d shows the user releasing the drag performed in FIG. 3c to cause a selection panel associated with the selected text to be presented, in this example embodiment. The selection panel includes a selection handle to allow the user to move the end location of the selected text, a confirm selection button, and a cancel selection button, each of which are indicated in FIG. 3d. The selection handle, in this example embodiment, can move the end location of the selected text by initiating a drag gesture on the handle and releasing the drag gesture such that the end of the selection is at the desired location. There is also a selection handle at the beginning of the text to allow the user to move the beginning location of the selected text in a similar manner. The confirm selection button will be discussed in more detail herein. The cancel selection button allows a user to cancel or otherwise unselect the selection. In some embodiments, the selection may also be canceled or otherwise unselected by tapping away from the selection or selection options (e.g., selection handles, confirm/cancel selection buttons, etc.).

Figure 3E:
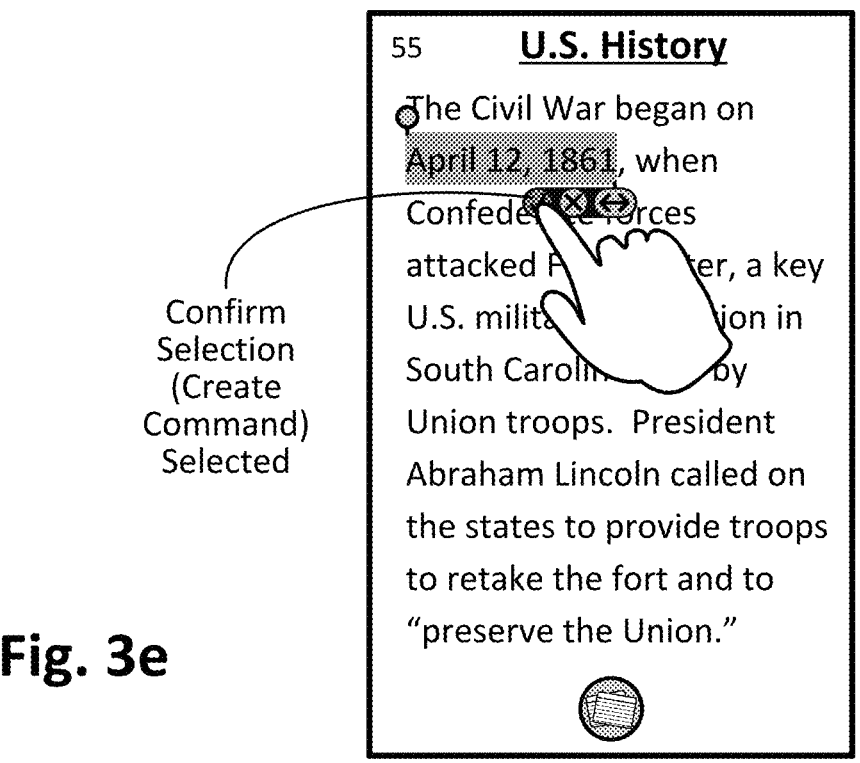
Figure 3F:
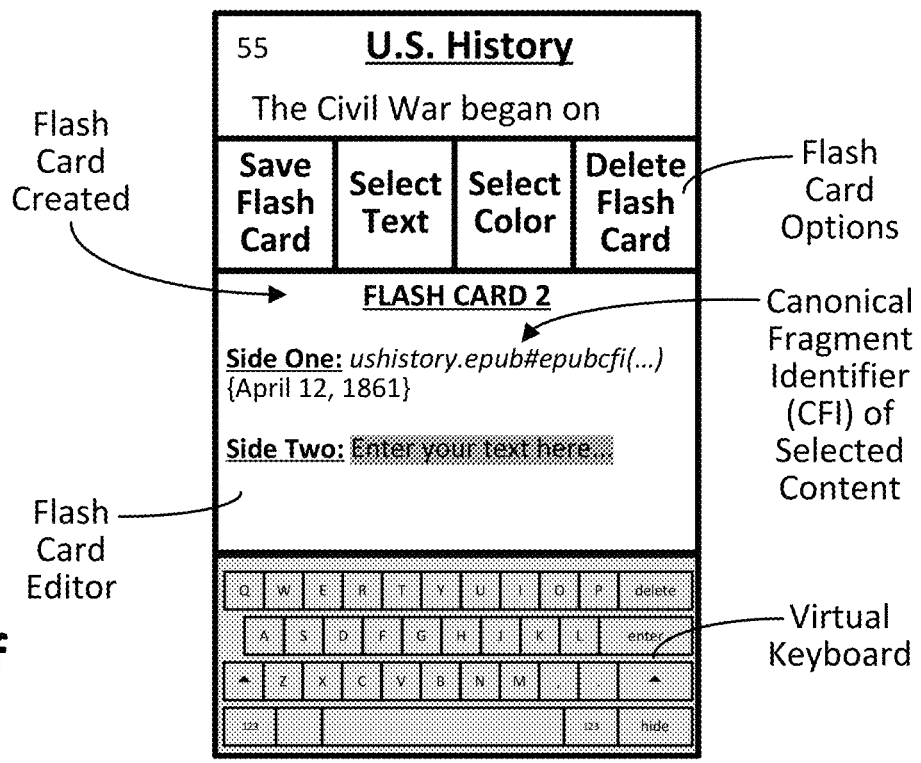

FIG. 3e shows the user selecting the confirm selection button to create a digital flash card, in this example embodiment. In other words, in this example embodiment, the confirm selection button is a flash card create command, that is used to create a digital flash card after a portion of already existing digital content has been selected (e.g., as was done in FIGS. 3c-d). FIG. 3f shows the flash card after the create command was performed in FIG. 3e to create the flash card (Flash Card 2), in this example embodiment. As can be seen in FIG. 3f, a link to the location of the selected portion of digital content was created on Side One of the digital flash card. As can also be seen in FIG. 3f, a virtual keyboard has been displayed (or otherwise presented) to allow the user to edit the contents of the flash card, as will be discussed in more detail herein. The location of the selected portion of digital content is identified by a canonical fragment identifier (CFI) on Side One and the actual content that the CFI represents ("Apr. 12, 1861") is shown in braces to, for example, aid the user when completing the flash card, in this example embodiment. However, in other embodiments, only the link or only the actual content may be shown. As can be seen in this example embodiment, the CFI created on Side One identifies the eBook including the linked-to content (ushistory.epub). Further, only one CFI was created to identify the location of the selected portion of content, which may be achieved by including a range of content that identifies the location of the selected portion or by including a beginning and ending location of the selected portion. In other embodiments, separate CFIs may be created to identify the location of the beginning and ending locations of the selected portion of digital content (e.g., where the selected portion spans a large area). The location of the selected portion of digital content may be linked-to (or otherwise identified) in any suitable manner, and in some embodiments, the identification format may depend upon the digital content source being used. For example, the beginning and ending locations may be identified using a volume, chapter, page, image, video, paragraph, sentence, word, and/or character, or any other suitable component of the digital content source, or combination thereof.

Continuing with FIG. 3f, the flash card mode, in this example embodiment, presents options for the user to edit the created flash card. The first option is a Save Flash Card option that allows the user to save the flash card after editing has been completed. The next option is a Select Text option that allows a user to select additional text in the original digital content (the U.S. History eBook, in this example case). Such an option may include a user choosing an insertion point in the created flash card (Flash Card 2, in this example case), and then selecting the additional content (e.g., using the process shown in FIGS. 3b-3e) to create a link to that content which is inserted at the previously chosen insertion point. The insertion point may be chosen by selecting text within the flash card editor box (e.g., to replace that text with the linked content) or placing the cursor at the desired location (e.g., to insert the linked content at that location). In this manner, a single flash card side could have multiple portions of linked-to content from one or more digital content sources. Further, two or more virtual sides of a flash card could include linked-to content. The next option is a Select Color option that may allow the user to select the color of the flash card content (e.g., text color), the color of a flash card side, and/or the color of the entire flash card, for example. The next option in this example embodiment is a Delete Flash Card option that can be selected to delete the created flash card. Other suitable options may be available after the flash card has been created and the flash card mode is not intended to be limited to any particular flash card option(s).

In the example embodiment illustrated in FIGS. 3a-f, the creation of a flash card included a three-part process—invoking the flash card mode (e.g., as described with reference to FIG. 3a), selecting content (e.g., as described with reference to FIGS. 3b-c), and then performing a create command (e.g., as described with reference to FIG. 3e). Further, as described with reference to FIG. 3e, the create command included selecting the confirm selection button. In other embodiments, the flash card mode may be configured to create a flash card with only a two-part process. In some such embodiments, a create command may be performed and then a portion of digital content may be selected to create a flash card including a link to the location of the portion of digital content. For example, invoking the flash card mode (e.g., as shown in FIG. 3a and described herein) may simultaneously perform the create command. In such an example, subsequently selecting a portion of digital content (e.g., as shown in FIGS. 3b-c and described herein) may then create a digital flash card including a link to the location of the portion of digital content. Therefore, in some embodiments, the create command may be performed prior to selecting the portion of digital content to create a digital flash card using the flash card mode.

In some embodiments, the flash card mode may be configured to provision a flash card create command within a context menu (or other suitable menu) accessible after performing an interaction (e.g., a right click, a double tap, a long press, etc.) with selected content. In such an embodiment, for example, the user can select the content that will be included in the flash card (in the form of a link to the location of the content), perform the interaction with the selected content to bring up the context menu, and then select the flash card create command context menu option (to create the flash card). The flash card create commands described herein are provided for illustrative purposes and are not intended to limit the flash card mode to the specific example provided. The mode may be configured with one or more of the flash card create commands described herein and/or any other suitable flash card create commands (whether the commands are performed prior to content being selected, while content is being selected, and/or after content has been selected).

Figure 3G:
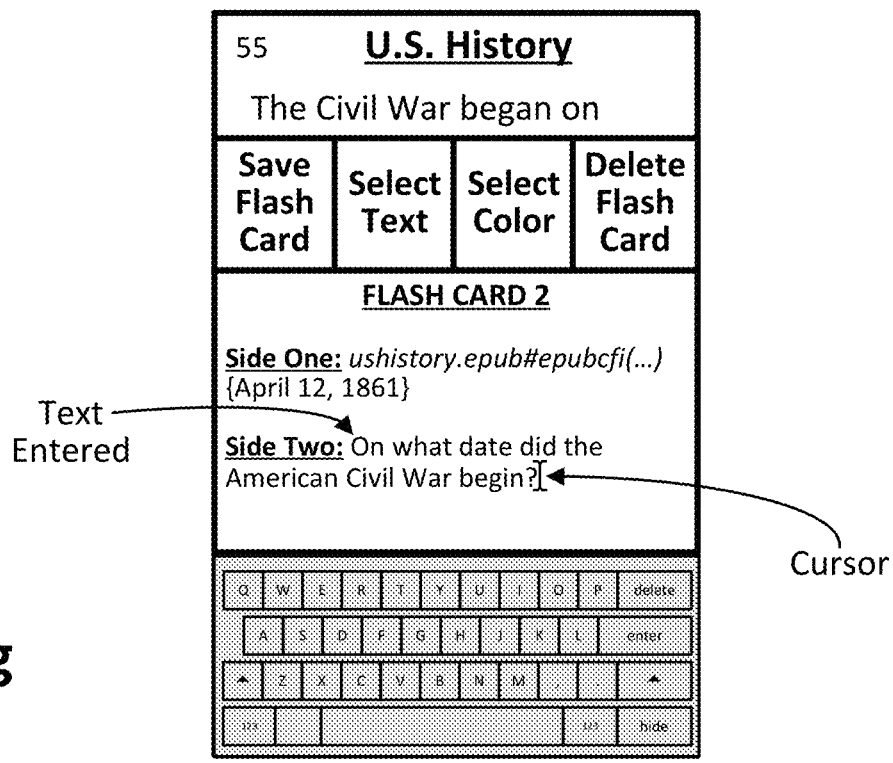

FIG. 3g shows the flash card editor after the flash card has been created and after text has been entered for Side Two of the flash card, in this example embodiment. The text may have been entered using the virtual keyboard or any other suitable input component. As can be seen, a cursor is shown in the editor box to indicate where text will be entered. In this example embodiment, the text entered ("On what date did the American Civil War begin?") is a question created by the user, and the linked-to portion of content ("Apr. 12, 1861") is the answer. Note that the flash card mode may be used to create any combination of content, and the question-answer construct is provided in this example embodiment for illustrative purposes and not intended to limit the present disclosure. Further note that the digital flash card created in this example embodiment only has two virtual sides, but in other embodiments, the digital flash card may have three or more virtual sides. In some embodiments, the flash card mode may be configured to allow the user to input additional links to portions of the original content into the digital flash card (e.g., using the Select Text option, as previously described). In some embodiments, the linked-to content (e.g., the linked-to content shown in brackets on Side One) may be editable by the user. For example, in some such embodiments, the user may be able to edit the content by selecting the link representing the content. In such an example, selecting the link may take the user back to a screen such as is shown in FIG. 3d, where the user can change the selected content.

Figure 3H:
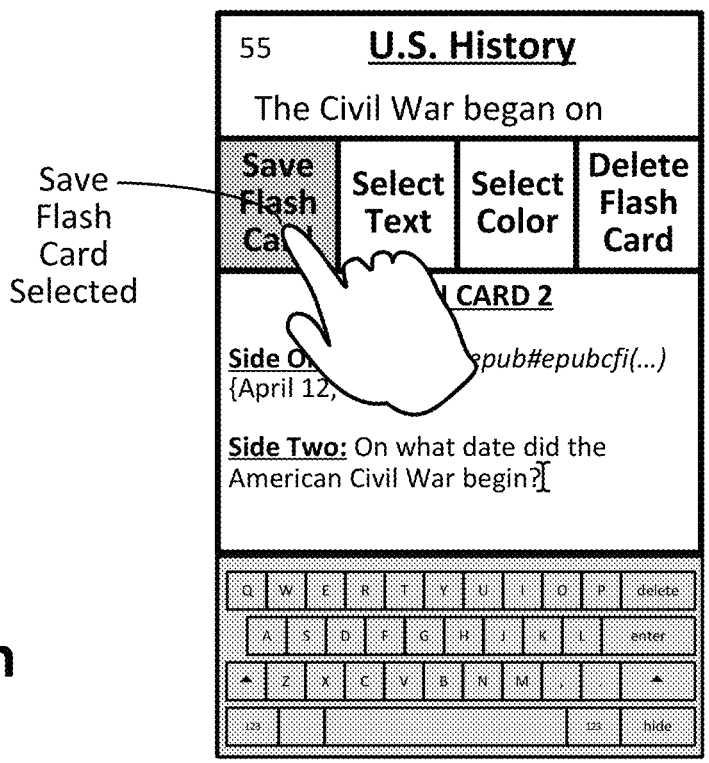
Figure 3I:
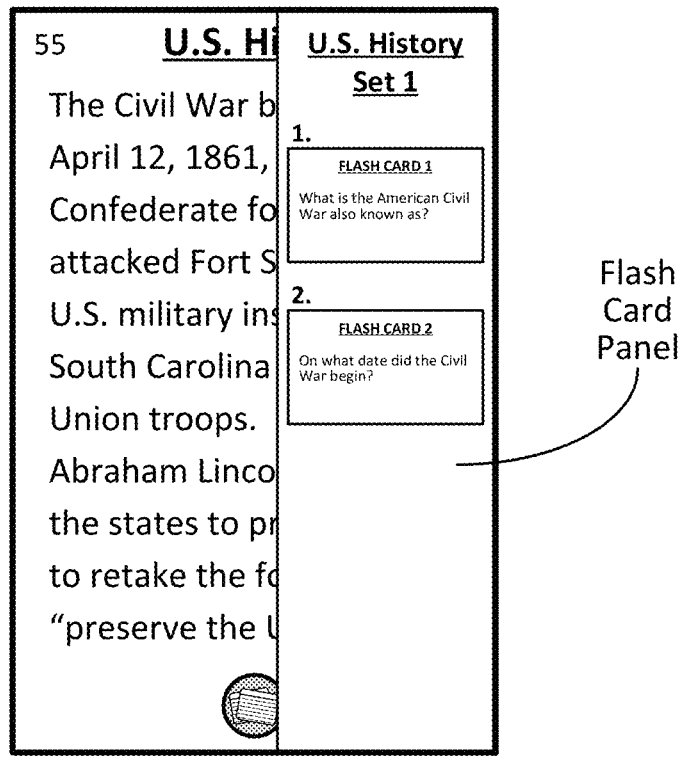

FIG. 3h shows the user saving the created flash card using the Save Flash Card option, in this example embodiment. In some embodiments, the flash card may be manually saved in another suitable manner (e.g., selecting an enter button, performing a gesture, etc.). In some embodiments, the flash card may be saved automatically. For example, returning to the original digital content (e.g., the U.S. History eBook in this example case) may save the flash card as created/edited in some embodiments. FIG. 3i shows an example flash card panel after the created flash card has been saved, in this example embodiment. As can be seen, the flash card panel includes U.S. History Set 1, which includes Flash Card 1 and Flash Card 2 (which was created in the screen shots shown in FIGS. 3a-h). In this example embodiment, the flash cards can be viewed, selected, edited, or otherwise interacted with via the flash card panel. For example, the user may be able to bring up a context menu with multiple options (e.g., open, edit, share, etc.) in response to an interaction with one or more flash cards (e.g., a right click, a double tap, a long press, etc.). Further, in this example embodiment, the flash card mode is configured to organize digital flash cards into flash card sets; however, that need not be the case in all configurations. Flash card sets will be discussed in more detail herein, such as with reference to FIGS. 5a-d.

Figure 3J:
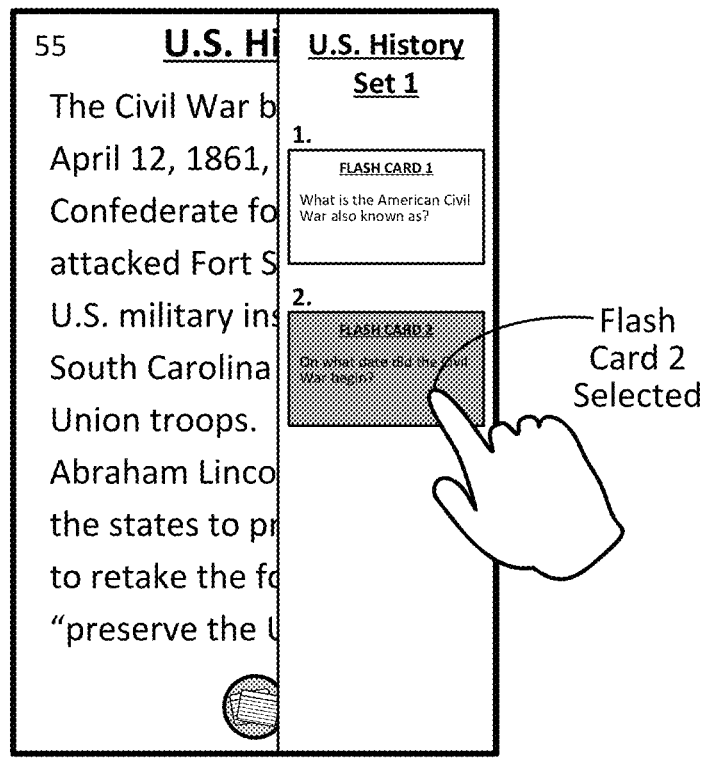
Figure 4A:
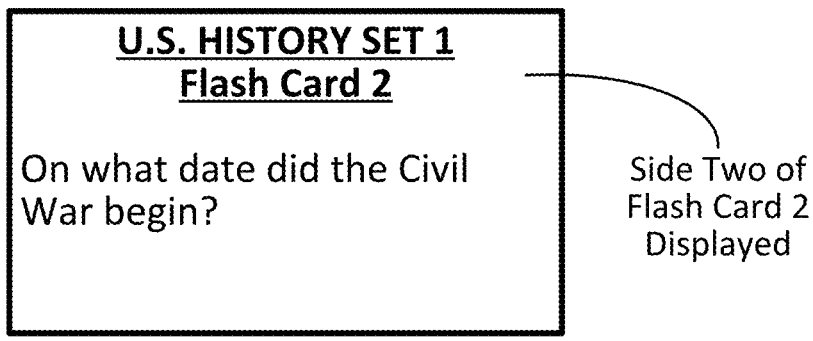
FIGS. 4a-c' illustrate an example flash card created using the flash card mode, in accordance with an embodiment of the present disclosure.
Figure 4B:
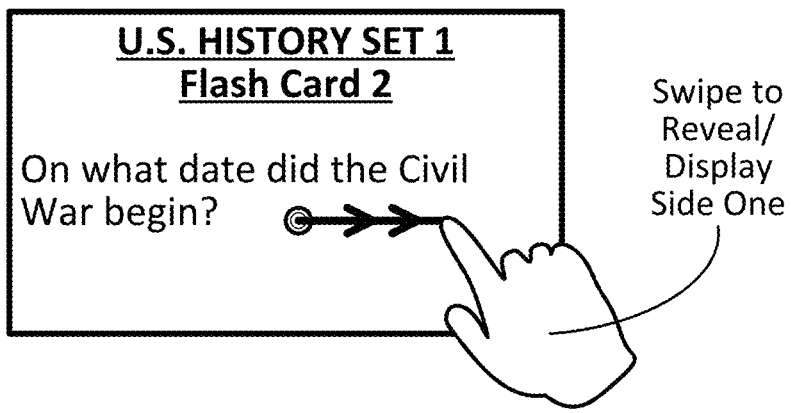
Figure 4C:
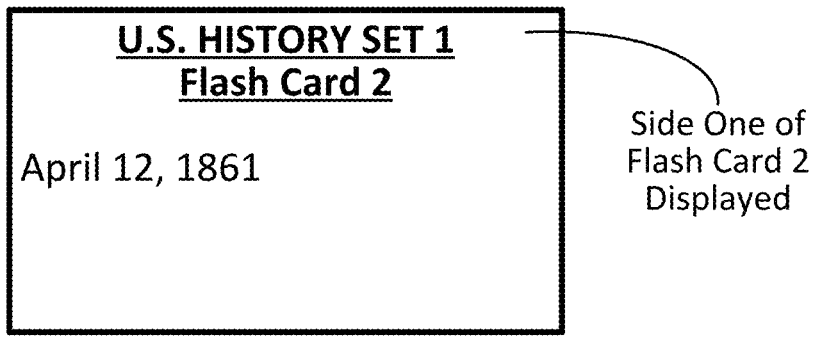
Figure 4C:
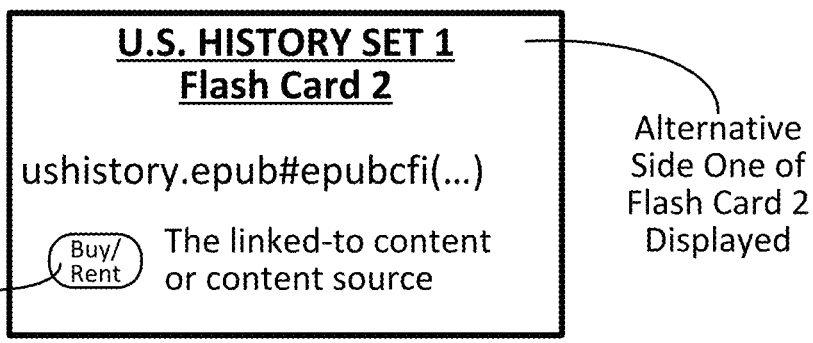

FIG. 3j shows a user selecting a digital flash card (Flash Card 2) from a flash card set (U.S. History Set 1). Selection of the flash card in this example embodiment causes the flash card to be displayed (or otherwise presented). FIGS. 4a-c illustrate an example flash card created using the flash card mode, in accordance with an embodiment of the present disclosure. As can be seen in FIG. 4a, the flash card is displayed (e.g., in response to the input provided in FIG. 3j). More specifically, Side Two of Flash Card 2 is displayed, and as previously described, the user-generated question on that side of the flash card is shown. FIG. 4b shows the user swiping to reveal or display (or otherwise present) Side One of Flash Card 2, in this example embodiment. Note that although revealing/displaying another side of the flash card is achieved by swiping the flash card, the present disclosure is not intended to be so limited. Therefore, any suitable input or action can be used to display (or otherwise present) another side of the flash card. FIG. 4c shows the result of the swipe performed in FIG. 4b, which is Side One of Flash Card 2. As can be seen, Side One of Flash Card 2 includes the linked-to portion of content ("Apr. 12, 1861") from the U.S. History eBook, which is also the answer to the user-generated question on Side Two of the flash card. Alternatively, if the user does not have free access to the U.S. History eBook, only the link to the location of the content may be displayed, such as is shown in FIG. 4c', and the user may be prompted to buy/rent the linked-to content in the flash card set (e.g., by selecting the buy/rent button), such as the "Apr. 12, 1861" answer and any other linked-to content, or to buy/rent the digital content source (the U.S. History eBook, in this example case), as will be discussed in more detail below.

Figure 5A:
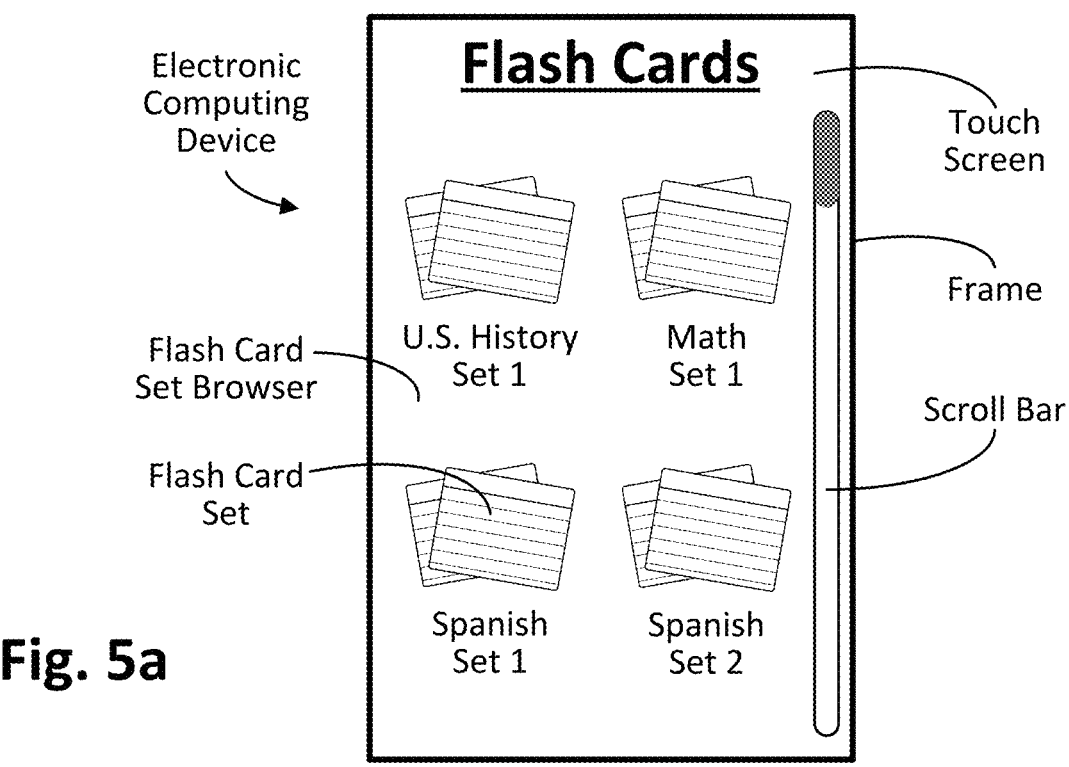
FIGS. 5a-d illustrate example screen shots showing interactions with flash card sets created using a flash card mode, in accordance with an embodiment of the present invention.

FIGS. 5a-d illustrate example screen shots showing interactions with flash card sets created using a flash card mode, in accordance with an embodiment of the present invention. As can be seen in FIG. 5a, an electronic computing device is shown having a housing/frame that includes a touch screen for displaying content and allowing user input (e.g., as previously described with reference to FIG. 3a). As can also be seen, a flash card set browser is displayed showing four flash card sets—U.S. History Set 1, Math Set 1, Spanish Set 1, and Spanish Set 2. Additional flash card sets may be accessed by scrolling down the screen using the scroll bar, in this example embodiment. Upon the creation of a flash card set (which may include one or more flash cards created using the flash card mode as variously described herein), the user may be prompted to name the set and/or a name may be automatically assigned to the set based on, for example, the original content linked-to by the flash cards in the set. For example, FIG. 3i shows Flash Cards 1 and 2 being a part of U.S. History Set 1. Therefore, the name of the flash card set, U.S. History Set 1, may have been manually entered by the user or automatically assigned based on the flash cards in the set including content from the U.S. History eBook.

Continuing with the screen shot shown in FIG. 5a, the flash card set browser may allow users to interact with the flash card sets in various ways, as will be discussed herein (e.g., with reference to FIG. 5b). The flash card set browser may include local flash card sets (e.g., flash card sets created by the user, downloaded by the user, etc.), flash card sets that are available from a distribution platform (e.g., GOOGLE PLAY, APPLE APP STORE, etc.), and/or flash card sets from any other suitable source, as will be apparent in light of this disclosure. The flash card sets may include linked-to content from any number of digital content sources and may also include user-generated content (UGC) from any number of users.

Figure 5B:
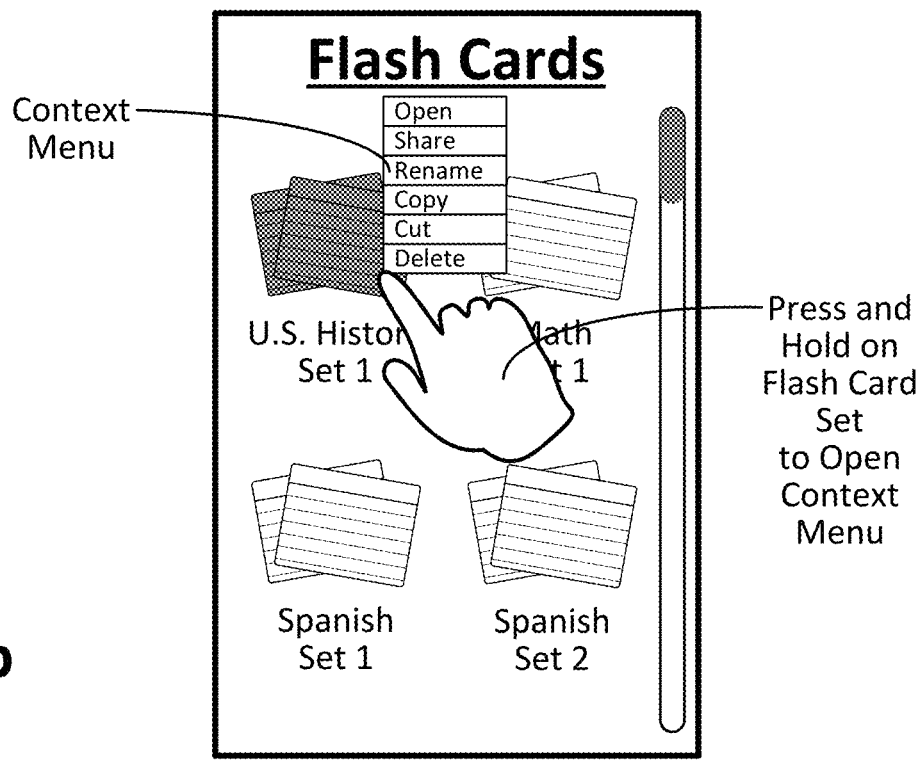

FIG. 5b shows the user performing an interaction (a press and hold, in this example case) on U.S. History Set 1 to bring up a context menu with multiple options. The options include being able to open the flash card set, as will be discussed in more detail with reference to FIGS. 5c-d. The options also include being able to share the flash card set, for example, via email, Bluetooth, near field communication (NFC), a cloud service, and/or any other suitable application or technique. In some embodiments, the flash card mode may be configured with a feature that allows a user sharing one or more flash card sets to see whether potential recipients have free access to the content sources linked-to by the flash card set(s). The options also include being able to rename, copy, cut, and delete the flash card set, all of which are commonly known functions. For completeness of description, the flash card mode may be configured, in this example embodiment, to perform a default interaction in response to a tap on the flash card set, such as opening the flash card set. The available options described in this example embodiment for interacting with flash card sets are provided for illustrative purposes and are not intended to limit the present disclosure.

Figure 5C:
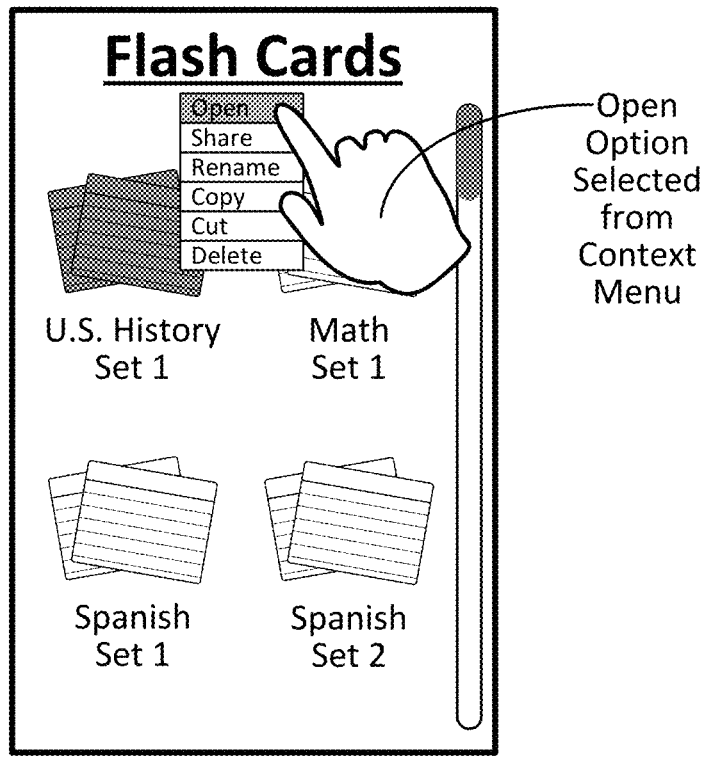
Figure 5D:
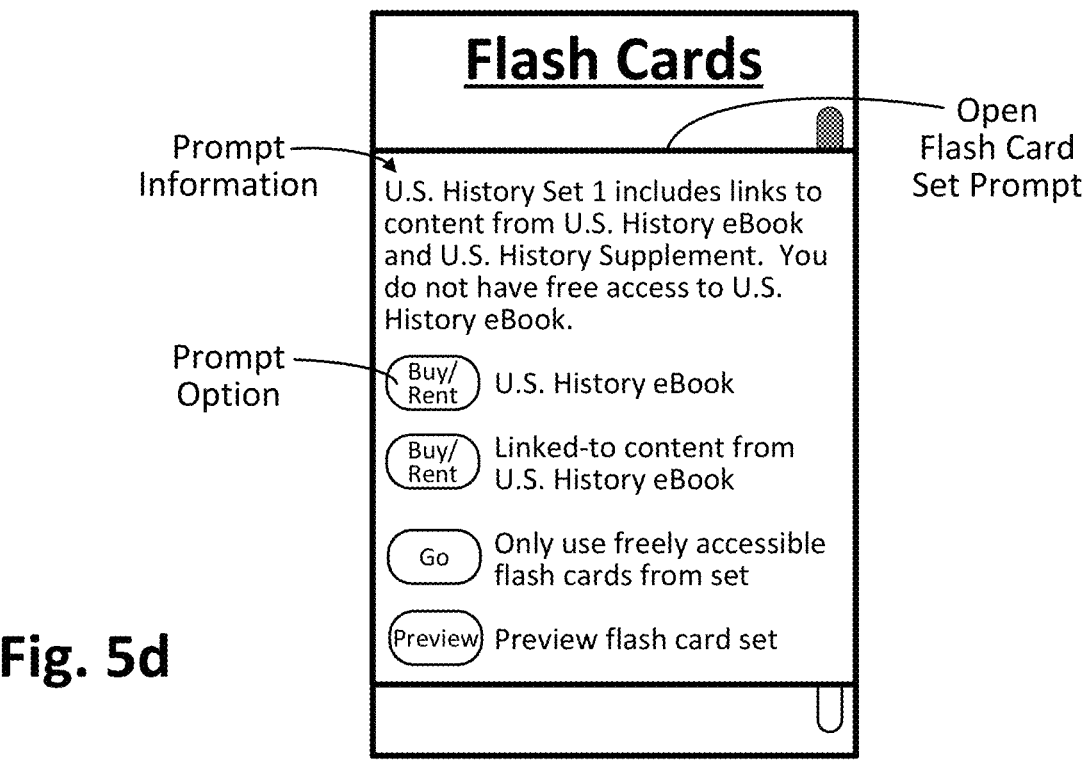

FIG. 5c shows the user selecting the open option from the context menu of FIG. 5b, to open U.S. History Set 1, in this example screen shot. FIG. 5d shows an example screen shot of a prompt related to the open selection performed in FIG. 5c. The prompt includes information based on the flash card set selected to be opened and also includes multiple options. The prompt information in this example screen shot explains to the user that U.S. History Set 1 includes links to content from two content sources—U.S. History eBook and U.S. History Supplement. The prompt further explains that the user does not have free access to the U.S. History eBook content source (and therefore has free access to the U.S. History Supplement content source). Whether the user has free access to one or more content sources may be determined using any suitable techniques, such as by checking the user's content licenses to determine whether the user owns or has free access to the source, by checking online or in the cloud to determine if the user can freely access the source (e.g., via a virtual/online library, a school/organization database, etc.), or by any other suitable technique as will be apparent in light of this disclosure.

Continuing with the example screen shot shown in FIG. 5d, the prompt includes multiple options that the user can select. The first is an option to buy or rent the U.S. History eBook content source. Selection of such an option may, for example, take the user to a virtual store to allow the user to purchase or rent a digital copy of the U.S. History eBook. The next option allows the user to buy or rent only the linked-to content from the U.S. History eBook. Selection of such an option may, for example, allow a user to access all of content linked-to in flash card set U.S. History Set 1, but not allow the user to access the rest of the U.S. History eBook. Such an option may also allow the user to access all of the content in the flash card set at a lower price (e.g., as compared to buying/renting the entirety of the U.S. History eBook). When the flash card mode includes such an option, after the user purchases/rents only the linked-to content from one or more sources, the user may be able to purchase/rent the entirety of the U.S. History eBook at a discounted rate, in some embodiments. The next option allows the user to only use the freely accessible flash cards from U.S. History Set 1. Selection of such an option may, for example, open only a subset of flash cards that do not include linked-to content from the U.S. History eBook source, or it may open all of the flash cards in the set, but not retrieve the linked-to content in the U.S. History eBook (and thereby display only the links or location identifiers, such as is shown in FIG. 4c', for example). The next option allows the user to preview U.S. History Set 1. Selection of such an option may, for example, allow the user to access/view one or more sides of a subset of the flash cards in U.S. History Set 1.

In some embodiments, flash card sets may be sold by the creator of the set to other users. In some such embodiments, those who purchase the flash card set may be paying a fee to use the premade set itself and may additionally have to pay to access the linked-to content (e.g., as variously described herein). In this manner, any copyright or DRM issues associated with the linked-to content sources can be circumvented. As may be appreciated, the example primarily used herein for the linked-to content ("Apr. 12, 1861") is a factual date and thus likely would not be subject to copyright protection (and may not be subject to DRM protection). To this end, it will be further appreciated that this example content was merely selected for ease of description and is not intended to imply or otherwise expand or limit the types of content that may be protectable using the various flashcard techniques provided herein. As will be further appreciated, there are virtually an unlimited number of instances where selected portions of digital content sources may be subject to copyright protection (and/or DRM protection), and the techniques provided herein can be used with any such instances, regardless of whether the content being used to make the flashcard is protectable or not. When flash cards are opened, used, viewed, bought, downloaded, etc., the flash card mode may be configured to pre-retrieve the linked-to content, retrieve the linked-to content while simultaneously viewing the flash card including such linked-to content, or perform any other suitable technique for retrieving the actual content based on the configuration of the flash card mode. As previously described, the content may not be able to be retrieved unless the user has free access to the digital content sources containing the linked-to portions of content. Numerous variations and configurations, and options and features will be apparent in light of the present disclosure.

Methodology

Figure 6:
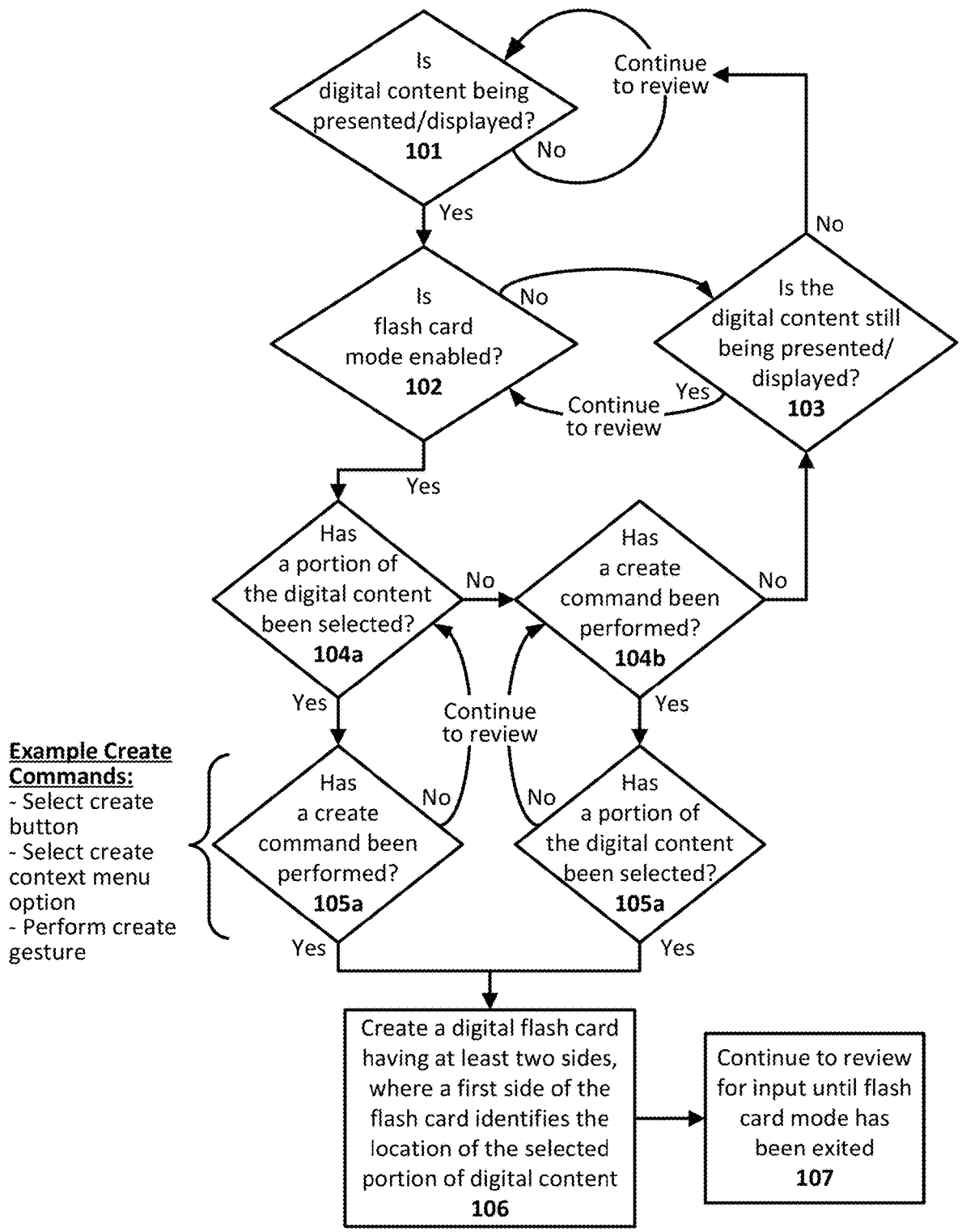
FIG. 6 illustrates a method for providing a flash card mode in an electronic computing device, in accordance with one or more embodiments of the present invention.

FIG. 6 illustrates a method for providing a flash card mode in an electronic computing device, in accordance with one or more embodiments of the present invention. The example methodology may be implemented, for instance, by the UI module of the example electronic computing device shown in FIG. 2a, or the example electronic computing device shown in FIG. 2b (e.g., with the UI provisioned to the client by the server). To this end, the UI may be implemented in software, hardware, firmware, or any suitable combination thereof, as will be appreciated in light of this disclosure. In computing devices including a touch screen or other touch-sensitive interface, the computing device may be able to detect contact, whether direct or proximate (e.g., via hovering input), which can be used in various ways to implement UI functionality, including selecting digital content, performing a create command, or other input as variously described herein.

In the example case illustrated in FIG. 5 the method starts by determining 101 if digital content is being presented/displayed. The digital content may include an electronic book (eBook), magazine, document, etc. and the digital content may be presented/displayed using any appropriate application or program, such as an eBook reader application, a document viewer, a pdf viewer, a slideshow viewer, or any other suitable application or program. If digital content is not being displayed (or otherwise presented), the method continues to review until such content is displayed. Once digital content is being displayed, the method continues by determining 102 if the flash card mode is enabled. As described herein, the flash card mode may be enabled via a settings menu (such as is shown in FIG. 1c) or via the application itself, for example. In some embodiments, the flash card mode may be tied to one or more applications capable of presenting/displaying digital content and the tool may not be available/enabled until one such application is running, active, and/or displayed (which may result in a conservation of device power and/or memory).

If the mode is not enabled, then the method continues by reviewing 103 if the digital content is still being displayed. If the content is not still being displayed, the method continues back at diamond 101 to review if digital content is being displayed. If the digital content is still being displayed, the method continues to review until either the mode is enabled or until the digital content is no longer being displayed. Once the mode is enabled (or if it was already enabled), the method continues by determining either 104*a* if a portion of the digital content has been selected or 104*b* if a create command has been performed. As described herein, selection of a portion of the digital content may include selecting/highlighting text and/or images, selecting an audio or video file/clip, or some other suitable selection of a portion of the digital content. As was also described, the create command may include selecting a create button (such as is shown in FIG. 3*e*, where the confirm selection button is selected to create a flash card), selecting a create context menu option, performing a create gesture, or some other suitable action. The create command may be hard-coded, user-configurable, or some combination thereof (e.g., where a default create command(s) can be used but a user-selected create command(s) can also be used). Further, the create command may be performed before or after the selection of the portion of digital content, depending upon the configuration of the flash card mode. If neither a portion of digital content has been selected nor a create command has been performed, the method continues to review 103 if the digital content is still being presented/displayed and 102 if the flash card mode is still enabled.

Once a portion of digital content has been selected or a create command has been performed, the method continues to review if the other of those two has occurred. For example, if at 104*a*, a portion of digital content has been selected, the method continues by determining 105*a* if a create command has been performed. Alternatively, if at 104*b*, the create command is performed before a portion of the digital content has been selected, the method continues by determining 105*b* if a portion of the digital content has been selected. The review continues until a portion of the digital content has been selected and a create command has been performed to create 106 a digital flash card. As variously described herein, the digital flash card created has at least two virtual sides, where a first side of the flash card identifies the location of the selected portion of digital content (e.g., using a link to the location). The location may be identified in any number of suitable ways, such as with a CFI, as described herein.

Note that, in some instances, if a portion of the digital content is selected at 104*a* and then that content is unselected prior to performing a create command at 105*a*, the method continues at 104*b* with a create command having been performed. In other words, in some instances, the portion of digital content may have to remain selected while performing a create command to create a digital flash card 106. Further note that, in some instances, if a create command has been performed at 104*b* and then the create command is canceled (or otherwise deactivated) prior to selecting a portion of the digital content at 105*a*, the method continues at 104*a* with a portion of the digital content having been selected. In other words, in some instances, the create command may have to remain active while selecting a portion of the digital content to create a digital flash card 106.

After a digital flash card has been created 106, the method continues to review 107 for input until the flash card mode has been exited. Additional input may include entering in content for a second side (and/or any additional sides) of the flash card (such as is shown in FIGS. 3*f-g*), editing the linked-to content on the first side of the flash card, adding additional linked-to content on any side of the flash card, saving the flash card, deleting the flash card, or any other suitable input as will be apparent in light of this disclosure. Example actions that may exit the flash card mode may include saving or deleting the created flash card, tapping or selecting in an area of the screen that is away from the created flash card, or hitting the home or power button of the computing device, just to name a few examples.

Numerous variations and embodiments will be apparent in light of this disclosure. One example embodiment of the present invention provides an electronic device including a display for presenting digital content to a user and a user interface including a flash card mode. The flash card mode is configured to create a digital flash card having at least two virtual sides in response to user input including selecting a portion of the digital content and performing a create command, wherein a first side of the digital flash card identifies the location of the selected portion of digital content. In some cases, the location of the selected portion of digital content is identified by a canonical fragment identifier (CFI). In some cases, the location of the selected portion of digital content is identified by a beginning canonical fragment identifier (CFI) and an ending CFI. In some cases, the digital content is an electronic book (eBook). In some cases, the digital flash card has a question-answer construct, wherein one side of the flash card represents a question and another side represents an answer. In some such cases, the answer is user-generated content and the question is based on the selected portion of digital content. In some cases, the flash card mode is configured to allow the user to enter text and/or select an additional portion of the digital content for a second side of the digital flash card. In some cases, the create command includes a button selection, a selection from a drop down menu, and/or a gesture. In some cases, one or more created flash cards are shareable and/or sellable. In some cases, one or more previously created flash cards are accessible and/or buyable by the user. In some such cases, prior to allowing the one or more previously created flash cards to be accessed and/or bought by the user, the flash card mode is configured to perform at least one of: allow the user to access and/or buy the flash cards if all digital content identified in the flash card set is freely accessible by the user; prompt the user to buy and/or rent the digital content sources containing the identified content if any digital content identified in the flash card set is not freely accessible by the user; and/or prompt the user to buy and/or rent the identified content if any digital content identified in the flash card set is not freely accessible by the user.

Another example embodiment of the present invention provides a computer program product comprising a plurality of instructions non-transiently encoded thereon that when executed by one or more processors cause a process to be carried out. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to create a digital flash card having at least two virtual sides in response to user input including selecting a portion of digital content and performing a create command, and identify the location of the selected portion of digital content for a first side of the digital flash card. In some cases, the location of the selected portion of digital content is identified by a canonical fragment identifier (CFI). In some cases, the location of the selected portion of digital content is identified by a beginning canonical fragment identifier (CFI) and an ending CFI. In some cases, the digital flash card has a question-answer construct, wherein one side of the flash card represents a question and another side represents an answer, wherein the answer is user-generated content and the question is based on the selected portion of digital content. In some cases, the process is configured to allow the user to enter text and/or select an additional portion of the digital content for a second side of the digital flash card. In some cases, the create command includes a button selection, a selection from a drop down menu, and/or a gesture. In some cases, one or more created flash cards are shareable and/or sellable. In some cases, one or more previously created flash cards are accessible and/or buyable by the user. In some such cases, prior to allowing the one or more previously created flash cards to be accessed and/or bought by the user, the process includes at least one of: allow the user to access and/or buy the flash cards if all digital content identified in the flash card set is freely accessible by the user; prompt the user to buy and/or rent the digital content sources containing the identified content if any digital content identified in the flash card set is not freely accessible by the user; and/or prompt the user to buy and/or rent the identified content if any digital content identified in the flash card set is not freely accessible by the user.

The foregoing description of the embodiments of the present disclosure have been presented for the purposes of illustration and description. It is not intended to be exhaustive or to limit the disclosure to the precise forms disclosed. Many modifications and variations are possible in light of this disclosure. It is intended that the scope of the present invention be limited not by this detailed description, but rather by the claims appended hereto.

What is claimed is:

1. A method for controlling access to flash cards, the method comprising:
accessing, via a user interface, a flash card mode wherein previously created first one or more flash cards and second one or more flash cards are accessible via the flash card mode and while in the flash card mode causing simultaneous display of (i) a first option to access the first one or more flash cards that are accessible without authorization to access digital content that includes answers to one or more questions displayed on the first one or more flash cards, and (ii) a second option to access the second one or more flash cards that are pre-viewable, but not fully accessible, without authorization to access the digital content, the digital content being stored separately from the first and second one or more flash cards; in response to a selection of the second option, causing display of a flash card of the second one or more flash cards, the displayed flash card including at least a first virtual side and a second virtual side, the first virtual side displaying a question, wherein an answer to the question is included in the digital content that is stored separately from the first and second one or more flash cards, in response to user access to the digital content not being authorized, causing display of, on the second virtual side of the displayed flash card, a canonical fragment identifier (CFI) that identifies a portion of the digital content with the answer to the question and an option to gain access to the digital content that includes the answer identified by the CFI; and in response to the option to gain access being selected from the second virtual side of the displayed flash card, authorizing user access to at least the portion of the digital content that includes the answer to the question.

2. The method of claim 1, further comprising, in response to user access to the digital content being authorized, retrieving the answer to the question from the section of the digital content using the canonical fragment identifier, and causing display of, on the second virtual side, the retrieved answer to the question.

3. The method of claim 1, wherein the option to gain access to at least a portion of the digital content includes an option to rent the digital content for a limited time.

4. The method of claim 1, wherein the option to gain access to at least a portion of the digital content includes an option to purchase the digital content.

5. The method of claim 1, wherein the digital content includes protection from copying.

6. The method of claim 1, further comprising providing a menu upon receiving a user selection of the first one or more flash cards or the second one or more flash cards, wherein the menu includes an option to share the selected first one or more flash cards or the selected second one or more flash cards with another user.

7. The method of claim 1, wherein the portion of the digital content with the answer to the question is identified by a beginning CFI and an ending CFI.

8. A computer program product including one or more non-transitory machine-readable mediums encoded with instructions that when executed by one or more processors cause a process to be carried out for controlling access to flash cards, the process comprising:
accessing, via a user interface, a flash card mode wherein previously created first one or more flash cards and second one or more flash cards are accessible via the flash card mode and while in the flash card mode causing simultaneous display of (i) a first option to access the first one or more flash cards that are accessible without authorization to access digital content that includes answers to one or more questions displayed on the first one or more flash cards, and (ii) a second option to access the second one or more flash cards that are pre-viewable, but not fully accessible, without authorization to access the digital content,
the digital content being stored separately from the first and second one or more flash cards; in response to a selection of the second option, causing display of a flash card of the second one or more flash cards, the displayed flash card including at least a first virtual side and a second virtual side, the first virtual side displaying a question, wherein an answer to the question is included in the digital content that is stored separately from the first and second one or more flash cards; in response to user access to the digital content not being authorized, causing display of, on the second virtual side of the displayed flash card, a canonical fragment identifier (CFI) that identifies a portion of the digital content with the answer to the question and an option to gain access to the digital content that includes the answer identified by the CFI, and in response to the option to gain access being selected from the second virtual side of the displayed flash card, authorizing user access to at least the portion of the digital content that includes the answer to the question.

9. The computer program product of claim 8, wherein the process further comprises, in response to user access to the digital content being authorized, retrieving the answer to the question from the section of the digital content using the canonical fragment identifier, and causing display of, on the second virtual side, the retrieved answer to the question.

10. The computer program product of claim 8, wherein the option to gain access to at least a portion of the digital content includes an option to rent the digital content for a limited time.

11. The computer program product of claim 8, wherein the option to gain access to at least a portion of the digital content includes an option to purchase the digital content.

12. The computer program product of claim 8, wherein the digital content is from an electronic book.

13. The computer program product of claim 8, wherein the process further comprises providing a menu upon receiving a user selection of the first one or more flash cards or the second one or more flash cards, wherein the menu includes an option to share the selected first one or more flash cards or the selected second one or more flash cards with another user.

14. The computer program product of claim 8, wherein the portion of the digital content with the answer to the question is identified by a beginning CFI and an ending CFI.

15. A computer program product including one or more non-transitory machine-readable mediums encoded with instructions that when executed by one or more processors cause a process to be carried out for controlling access to flash cards, the process comprising:

accessing, via a user interface, a flash card mode, and while in the flash card mode, in response to user input including selecting a portion of digital content and performing a create command, create a flash card having at least two virtual sides, the portion of digital content having a location within the digital content; cause simultaneous display of (1) a canonical fragment identifier (CFI) that identifies the location of the selected portion of digital content and (2) a prompt that prompts the user to enter a question related to the selected portion of digital content, the canonical fragment identifier being visually associated with a first virtual side of the flash card, and the question being visually associated with a second virtual side of the flash card and in response to user access to the digital content not being authorized, causing display of, on the first virtual side of the displayed flash card, the canonical fragment identifier that identifies the portion of the digital content with the answer to the question and an option to gain access to the digital content that includes the answer identified by the canonical fragment identifier.

16. The computer program product of claim 15, wherein the location of the selected portion of digital content is identified by a beginning CFI and an ending CFI.

17. The computer program product of claim 15, wherein the flash card is shareable and/or sellable.

18. The computer program product of claim 15, wherein the flash card is a first flash card and the digital content is a first digital content, the process further comprising:

causing simultaneous display of (i) a first option to access a second flash card that is accessible without authorization to access second digital content that includes an answer to a question displayed on the second flash card, and (ii) a second option to access a third flash card that is pre-viewable, but not fully accessible, without authorization to access the second digital content, the second digital content being stored separately from the second and third flash cards.

19. The computer program product of claim 18, the process further comprising:

in response to a selection of the second option, causing display of the third flash card, the third flash card including at least a first virtual side and a second virtual side, the first virtual side displaying a question, wherein an answer to the question is included in the second digital content.

20. The computer program product of claim 19, the process further comprising: in response to user access to the second digital content not being authorized, causing display of, on the second virtual side of the third flash card, an option to gain access to at least a portion of the second digital content that includes the answer to the question; and in response to the option to gain access being selected from the second virtual side of the third flash card, authorizing user access to at least the portion of the second digital content that includes the answer to the question.

* * * * *